United States Patent
Doken et al.

(10) Patent No.: US 9,641,564 B2
(45) Date of Patent: May 2, 2017

(54) MAINTAINING CONTROLLEE INFORMATION IN COLLABORATIVE SESSIONS

(75) Inventors: Serhad Doken, San Diego, CA (US); Haipeng Jin, Carlsbad, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 12/779,682

(22) Filed: May 13, 2010

(65) Prior Publication Data

US 2010/0312834 A1  Dec. 9, 2010

Related U.S. Application Data

(60) Provisional application No. 61/178,476, filed on May 14, 2009, provisional application No. 61/180,556,
(Continued)

(51) Int. Cl.
*G06F 15/16* (2006.01)
*H04L 29/06* (2006.01)

(52) U.S. Cl.
CPC .......... *H04L 65/1093* (2013.01); *H04L 65/00* (2013.01); *H04L 65/4015* (2013.01)

(58) Field of Classification Search
CPC .................................................. H04L 65/1093
(Continued)

(56) References Cited

U.S. PATENT DOCUMENTS

2002/0062379 A1* 5/2002 Widegren et al. ............ 709/227
2002/0078233 A1* 6/2002 Biliris et al. .................. 709/238
(Continued)

FOREIGN PATENT DOCUMENTS

CN  101309509 A  11/2008
CN  101370292 A  2/2009
(Continued)

OTHER PUBLICATIONS

3rd Generation Partnership Project; Technical Specification Group Core Network and Terminals; IP Multimedia (IM) Core Network (CN) subsystem IP Multimedia Subsystem (IMS) Service Continuity; Stage 3 (Release 8)3GPP Standard; 3GPP TS 24.237, SRD Generation.
(Continued)

*Primary Examiner* — Hua Fan
(74) *Attorney, Agent, or Firm* — Kristine Ekwueme; Guy Perry

(57) ABSTRACT

A communication system extends IETF Session Initiation Protocol (SIP) signaling used by IMS architecture. As a basic use case, initially a first user equipment (UE1) (controller) is in a media session (e.g., audio, video and message session) with a remote UE. To transfer provider of one media component to a controllee UE, the controller UE1 sends a REFER message with a relevant body to trigger the media session operations to a Service Centralization and Continuity Application Server (SCC AS). The SCC AS is able to interpret the contents of the REFER message to perform the media session manipulation on one or multiple UEs (originating UE itself or other UEs). The innovation provides for a REFER message that convey what needs to be done in a separate SIP header carrying target dialog and media line number(s), in a SDP body that REFER carries, or XML body that will be in REFER.

52 Claims, 17 Drawing Sheets

Related U.S. Application Data filed on May 22, 2009, provisional application No. 61/180,537, filed on May 22, 2009.

(58) Field of Classification Search
USPC .......................................................... 709/205
See application file for complete search history.

(56) References Cited

U.S. PATENT DOCUMENTS

| | | | |
|---|---|---|---|
| 2002/0112073 A1* | 8/2002 | MeLampy | H04L 29/06027 709/240 |
| 2002/0120749 A1* | 8/2002 | Widegren et al. | 709/227 |
| 2003/0023730 A1 | 1/2003 | Wengrovitz et al. | |
| 2004/0031058 A1* | 2/2004 | Reisman | 725/112 |
| 2005/0036492 A1* | 2/2005 | Hoffmann | H04L 29/06027 370/395.2 |
| 2005/0122524 A1 | 6/2005 | Ibarra et al. | |
| 2006/0153352 A1 | 7/2006 | Schmidt et al. | |
| 2009/0135724 A1* | 5/2009 | Zhang | H04L 41/5025 370/241 |
| 2009/0150562 A1 | 6/2009 | Kim et al. | |
| 2009/0191873 A1* | 7/2009 | Siegel et al. | 455/435.2 |
| 2009/0210478 A1 | 8/2009 | Bakker et al. | |
| 2009/0259758 A1* | 10/2009 | Chen et al. | 709/228 |
| 2009/0286516 A1* | 11/2009 | Sedlacek et al. | 455/414.1 |
| 2009/0313378 A1* | 12/2009 | Mahdi et al. | 709/227 |
| 2010/0064172 A1 | 3/2010 | George et al. | |
| 2010/0074223 A1* | 3/2010 | Mahdi | 370/331 |
| 2010/0074224 A1* | 3/2010 | Mahdi et al. | 370/331 |
| 2010/0077459 A1* | 3/2010 | Mahdi et al. | 726/4 |
| 2010/0103927 A1* | 4/2010 | Bakker | 370/352 |
| 2010/0146142 A1* | 6/2010 | Long et al. | 709/231 |
| 2010/0279670 A1* | 11/2010 | Ghai et al. | 455/414.3 |
| 2010/0293222 A1* | 11/2010 | Pope et al. | 709/203 |
| 2010/0312832 A1* | 12/2010 | Allen et al. | 709/204 |
| 2010/0312841 A1 | 12/2010 | Doken et al. | |
| 2010/0312897 A1* | 12/2010 | Allen et al. | 709/227 |
| 2011/0040836 A1* | 2/2011 | Allen et al. | 709/205 |
| 2011/0040881 A1 | 2/2011 | Coulas et al. | |
| 2011/0173434 A1 | 7/2011 | Buckley et al. | |
| 2012/0143984 A1* | 6/2012 | Liu et al. | 709/217 |
| 2012/0177193 A1 | 7/2012 | Keller et al. | |
| 2013/0013796 A1 | 1/2013 | Kim et al. | |

FOREIGN PATENT DOCUMENTS

| | | |
|---|---|---|
| CN | 101394605 A | 3/2009 |
| EP | 2086184 A1 | 8/2009 |
| JP | 2004229270 A | 8/2004 |
| JP | 2006501734 A | 1/2006 |
| WO | WO-2006113116 A1 | 10/2006 |

OTHER PUBLICATIONS

3rd Generation Partnership Project; Technical Specification Group Services and System Aspects; IP Multimedia Subsystem (IMS) service continuity enhancements; Service, policy and interaction; Stage 2 (Release 9) 3GPP Standard; 3GPP TR 23.838, 3rd Generation Partnership Project (3GPP), Mobile Competence Centre ; 650, Route Des Lucioles ; F-06921 Sophia-Antipolis Cedex ; France, No. VI.1.0, Apr. 1, 2009 (Apr. 1, 2009), pp. 1-53, XP050363944.

International Search Report and Written Opinion—PCT/US2010/034983, International Search Authority—European Patent Office—Sep. 9, 2010.

Kutscher Ott Bormann Tzi et al: "Session Description and Capability Negotiation; draft-i etf-mmus i c-sdpng-08.txt" IETF Standard-Working-Draft, Internet Engineering Task Force, IETF, CH, vol. mmusic, No. 8, Feb. 20, 2005 (Feb. 20, 2005), XP015023241 ISSN.

Nokia et al: "Clarify determining the capabilities of an UE to act as Controller/Controllee UE" 3GPP Draft; S2-091958, SRD Generation.

Partnership Project (3GPP), Mobile Competence Centre ; 650, Route Des Lucioles ; F-06921 Sophia-Antipolis Cedex ; France.

Taiwan Search Report—TW099115523—TIPO—Apr. 19, 2013.

\* cited by examiner

MAINTAINING CONTROLLEE INFORMATION IN COLLABORATIVE SESSIONS

CLAIM OF PRIORITY UNDER 35 U.S.C. §119

The present Application for Patent claims priority to Provisional Application No. 61/178,476 entitled "Method and Apparatus for Controlling Media in Collaborative Sessions" filed May 14, 2009, to Provisional Application No. 61/180,556 entitled "Methods and Apparatus for Informing UE of Controller Status in Collaborative Sessions" filed May 22, 2009, and to Provisional Application No. 61/180,537 entitled "Methods and Apparatus for Maintaining Media and Controllee Information in IMS UIT" filed May 22, 2009, each assigned to the assignee hereof and hereby expressly incorporated by reference herein.

REFERENCE TO CO-PENDING APPLICATIONS FOR PATENT

The present Application for Patent is related to the following co-pending U.S. patent application Ser. No. 12/779,694 "Controlling Media And Informing Controller Status In Collaborative Sessions" by Jin Haipeng, et al., filed concurrently herewith, assigned to the assignee hereof, and expressly incorporated by reference herein

BACKGROUND

Field

The present disclosure relates to a mobile operating environment, and more particularly, to collaborative sessions for inter-user equipment transfers.

Background

Wireless communication networks are widely deployed to provide communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

IP Multimedia (IM) Core Network (CN) Service Centralization and Continuity (SCC) provides the capability of continuing ongoing communication sessions with multiple media across different access networks or across different user equipments (UEs) under the control of the same subscriber. When the communication session is transferred across different UEs, the session can be a collaborative session with controller and controllee UEs. Generally, there can only be one controller UE, or one controller UE at a time, but several controllee UEs can be in the collaborative session.

Protocols can enable IMS SCC based on the Session Initiation Protocol (SIP) and the Session Description Protocol (SDP) and the protocols of the 3GPP Circuit-Switched (CS) domain. However, challenges remain since it can be necessary for changes to arise in a source UE for providing media, moreover control can be transferred.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for inter-user equipment transfer in a collaborative session. A first user equipment communicates to a remote end during a data packet session. The first user equipment controls a second user equipment for inter-user equipment transfer during a collaborative session by communicating with a network entity. The first user equipment determines a change in a media operation for the collaborative session. The first user equipment maintains media components information about the collaborative session updated for the change in the media operation.

In another aspect, at least one processor is provided for inter-user equipment transfer in a collaborative session. A first module communicates from a first user equipment to a remote end during a data packet session. A second module controls a second user equipment for inter-user equipment transfer during a collaborative session by communicating with a network entity. A third module maintains media components information about the collaborative session updated for a change in a media operation.

In an additional aspect, a computer program product is provided for inter-user equipment transfer in a collaborative session. A non-transitory computer-readable storage medium comprises sets of codes. A first set of codes causes a computer to communicate from a first user equipment to a remote end during a data packet session. A second set of codes causes the computer to control a second user equipment for inter-user equipment transfer during a collaborative session by communicating with a network entity. A third set of codes causes the computer to maintain media components information about the collaborative session updated for a change in a media operation.

In another additional aspect, an apparatus is provided for inter-user equipment transfer in a collaborative session. Means are provided for communicating from a first user equipment to a remote end during a data packet session. Means are provided for controlling a second user equipment for inter-user equipment transfer during a collaborative session by communicating with a network entity. Means are provided for maintaining media components information about the collaborative session updated for a change in a media operation.

In a further aspect, an apparatus is provided for inter-user equipment transfer in a collaborative session. A transceiver communicates from a first user equipment to a remote end during a data packet session. A computing platform controls, via the transceiver, a second user equipment for inter-user equipment transfer during a collaborative session by communicating with a network entity, and maintains media components information about the collaborative session updated for a change in a media operation.

In yet a further aspect, a method is provided for inter-user equipment transfer in a collaborative session. A network entity remotely facilitates across a network a collaborative session of a first user equipment and a second user equipment with a remote end during a data packet session for inter-user equipment transfer. A computing platform maintains media components information about the collaborative session updated for a change in a media operation.

In yet another aspect, at least one processor is provided for inter-user equipment transfer in a collaborative session. A first module remotely facilitates across a network a collaborative session of a first user equipment and a second user equipment with a remote end during a data packet session for inter-user equipment transfer. A second module maintains media components information about the collaborative session updated for a change in a media operation.

In yet an additional aspect, a computer program product is provided for inter-user equipment transfer in a collaborative session. A non-transitory computer-readable storage medium comprises sets of codes. A first set of codes causes a computer to remotely facilitate across a network a collaborative session of a first user equipment and a second user equipment with a remote end during a data packet session for inter-user equipment transfer. A second set of codes causes the computer to maintain media components information about the collaborative session updated for a change in a media operation.

In yet another additional aspect, an apparatus is provided for inter-user equipment transfer in a collaborative session. Means are provided for remotely facilitating across a network a collaborative session of a first user equipment and a second user equipment with a remote end during a data packet session for inter-user equipment transfer. Means are provided for maintaining media components information about the collaborative session updated for a change in a media operation.

In yet a further aspect, an apparatus is provided for inter-user equipment transfer in a collaborative session. A network interface remotely facilitates across a network a collaborative session of a first user equipment and a second user equipment with a remote end during a data packet session for inter-user equipment transfer. A computing platform maintains media components information about the collaborative session updated for a change in a media operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
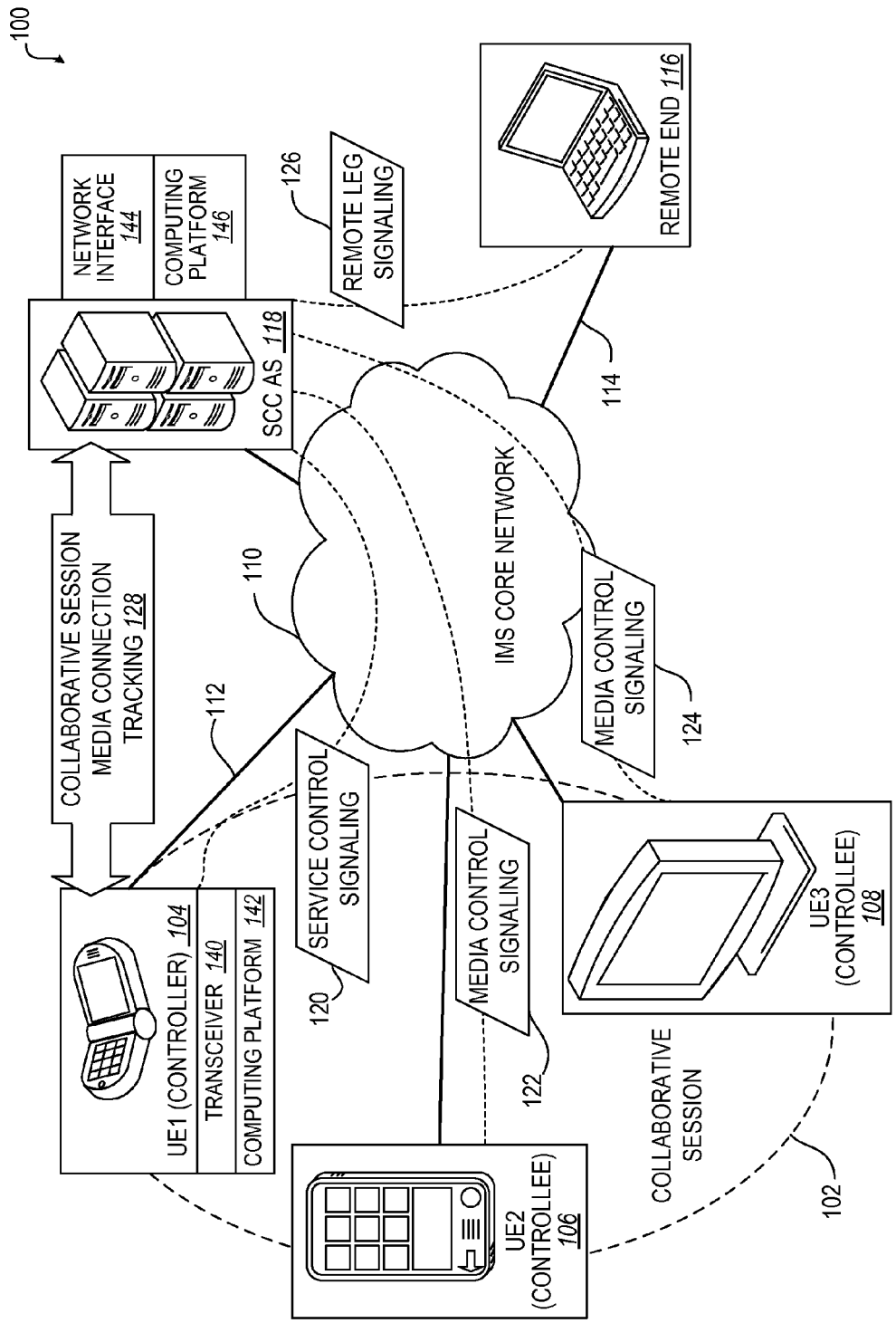
FIG. 1 illustrates a schematic diagram of a communication system in which a collaborative session of user equipment performs inter-user equipment transfer (IUT) while communicating to a remote end via a core network and a network entity.

A communication system extends IETF (Internet Engineering Task Force) SIP (Session Initiation Protocol) signaling used by IMS (IP Multimedia Subsystem) architecture. As a basic use case, initially a first user equipment (UE1) (controller) is in a media session (e.g., audio, video and message session) with a remote UE. To transfer provider or consumer of one media component to a controllee UE, the controller UE1 sends a REFER message with a relevant body to trigger the media session operations to SCC AS. Service Centralization and Continuity Application Server (SCC AS) is able to interpret the contents of the REFER message to perform the media session manipulation on one or multiple UEs (originating UE itself or other UEs).

In another aspect, in IMS Inter-UE Transfer (IUT), the controller UE and the SCC AS need to have a consistent view of the media components in the collaborative session and how they are distributed among all the controllee UEs. The present innovation can allow both the controller UE and SCC AS to track these changes.

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Disclosed examples provide methods and apparatus for user equipment to control media in collaborative sessions. With wide spread use of the Internet and the proliferation of numerous wired and wireless communication devices, individuals and organizations are becoming IP connected. There is a need today, and there will be even greater need in the future, to access any telecommunication (telecom) and data communication (datacom) service, such as voice, video, IM at anytime, anywhere and using any communication device. It is natural to envision that users want to be able to move between devices, to move media streams between devices back and forth, and to manipulate media among devices. Methods and apparatus disclosed herein enable users to perform such varied media operations from their user equipment (UE).

The media operations referred to above include adding, deleting, modifying characteristics (such as changing the codec (coder-decoder), direction, etc.) of a media stream, transferring media sessions, retrieving them back, mixing and duplicating media streams, etc. These operations may be done by a UE on media streams the UE itself, or any UE and multiple UEs provide at one time.

In some scenarios, the focus has been on limited media types, e.g., audio and video only, on a transfer operation, or on a method for collaborating related media sessions. Examples disclosed herein provide the ability to modify multiple media sessions and perform multiple operations all at once. In some disclosed aspects, use of Extensible Markup Language (XML) provides the benefit of being expandable to accommodate further operations/additions that may arise in the future.

Disclosed examples relate to document entitled "3GPP TS 24.237: IP Multimedia Subsystem (IMS) Service Continuity; Stage 3".

In some examples, the Internet Engineering Task Force (IETF) Session Initiation Protocol (SIP) signaling used by IP multimedia subsystem (IMS) architecture is extended. One example is described with reference to FIG. 1. A communication system 100 is depicted wherein a collaborative session 102 has been established between user equipment (UE), specifically a first UE ("UE1") 104 that acts as a controller, a second UE ("UE2") 106 that acts as a controllee, and a third UE ("UE3") 108 that also acts as a controllee. Each UE 104, 106, 108 is connected to an IMS Core Network (CN) 110 via a respective local leg 112 for signaling and potentially media transfer ultimately to a remote leg 114 to a remote end 116. The collaborative session 102 appears as originated from one signaling UE to the remote end 116 due to the operation of a Service Centralization and Continuity (SCC) Application Server (AS) 118 that is also coupled to the IMS CN 110. Control of the inter-UE transfer (IUT) is accomplished by service control signaling 120 between the UE1 104 and the SCC AS 118, media control signaling 122 between the UE2 106 and the SCC AS 118, media control signaling 124 between the UE3 108 and the SCC AS 118, and remote leg signaling 126 between the remote end 116 and the SCC AS 118. The communication system 100 performs collaborative session media connection tracking 128.

In one aspect, an apparatus such as the UE1 104 acts as controller for IUT in the collaborative session 102. A transceiver 140 of the UE1 104 communicates to a remote end 116 during a data packet session. A computing platform 142 of the UE1 104 controls, via the transceiver 140, the UE2 106 for IUT the collaborative session 102 by communicating with a network entity, depicted as the SCC AS 118. The computing platform 142 determines a change in a media operation for the collaborative session 102 and maintains media components information about the collaborative session 102 updated for the change in the media operation.

In another aspect, an apparatus is depicted as the SCC AS 118 for inter-user equipment transfer in a collaborative session. Its network interface 144 remotely facilitates across a network, depicted as the IMS CN 110, the collaborative session 102 of UE1 104, UE2 106, and UE3 108 with the remote end 116 during a data packet session for UE. The network interface 144 receives a change in a media operation for the collaborative session 102. A computing platform 146 of the SCC AS 118 maintains media components information about the collaborative session 102 updated for the change in the media operation.

Maintaining Media and Controllee Information in IMS Inter-User Equipment Transfer (IUT).

In an exemplary aspect, disclosed examples provide methods and apparatus for maintaining media and controllee information in Internet protocol multimedia subsystem inter-UE transfer (IMS IUT). With wide spread use of the Internet and the proliferation of numerous wired and wireless communication devices, individuals and organizations are becoming hyper connected. In IMS IUT, the controller UE and the SCC AS need to have a consistent view of the media components in the collaborative session and how they are distributed among all the controllee UEs.

Disclosed examples provide several alternatives for maintaining media and controllee information between the controller and the SCC AS. Disclosed examples range from providing a lot of change to current SIP/SDP signaling to small change to current SIP/SDP signaling. The present disclosure relates to document entitled "3GPP TS 24.237: IP Multimedia Subsystem (IMS) Service Continuity; Stage 3," hereby incorporated by reference herein.

Figure 2:
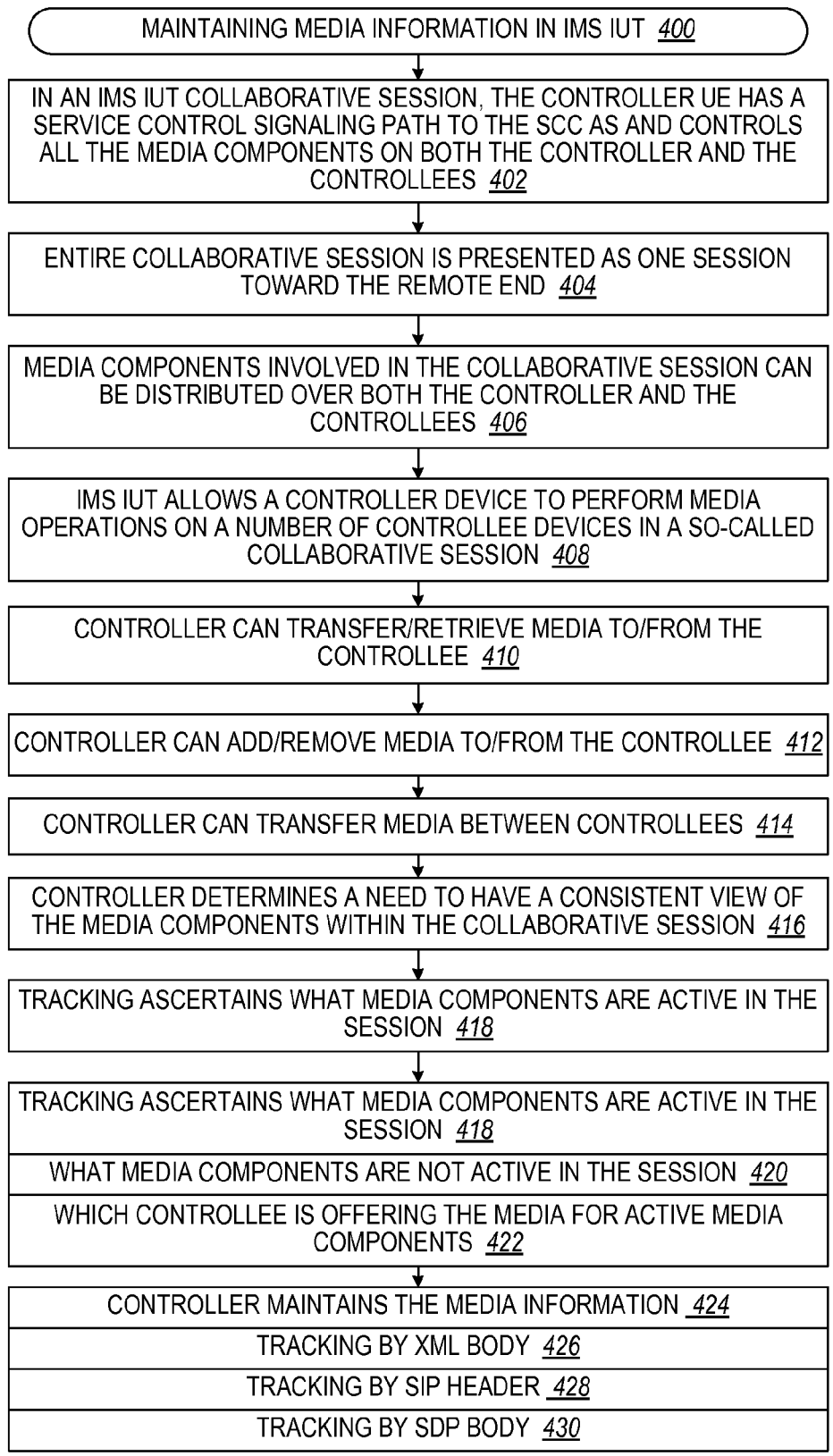
FIG. 2 illustrates a flow diagram for a methodology for maintaining media information in IP Multimedia Subsystem (IMS) IUT.

In FIG. 2, a methodology 400 is depicted for maintaining media information in IMS IUT, enhancing what has been standardized for 3GPP Release 8 et seq. In an IMS IUT collaborative session, the controller UE has a service control signaling path to the SCC AS and controls all the media components on both the controller and the controllees (block 402). The entire collaborative session is presented as one session toward the remote end (block 404). The media components involved in the collaborative session can be distributed over both the controller and the controllees (block 406).

IMS IUT allows a controller device to perform media operations on a number of controllee devices in a so-called collaborative session (block 408). For instance, the controller can transfer/retrieve media to/from the controllee (block 410), the controller can add/remove media to/from the controllee (block 412), and the controller can transfer media between controllees (block 414).

In order for the controller to perform all the intended IUT operations, the controller determines a need to have a consistent view of the media components within the collaborative session (block 416). This tracking can ascertain what media components are active in the session (block 418), what media components are not active in the session (block 420), and which controllee is offering the media for active media components (block 422).

In block 424, the controller maintains the media information. In one aspect, the tracking is by XML body (block 426). In another aspect, the tracking is by SIP header (block 428). In an additional aspect, the tracking is by SDP body (block 430).

Figure 3:
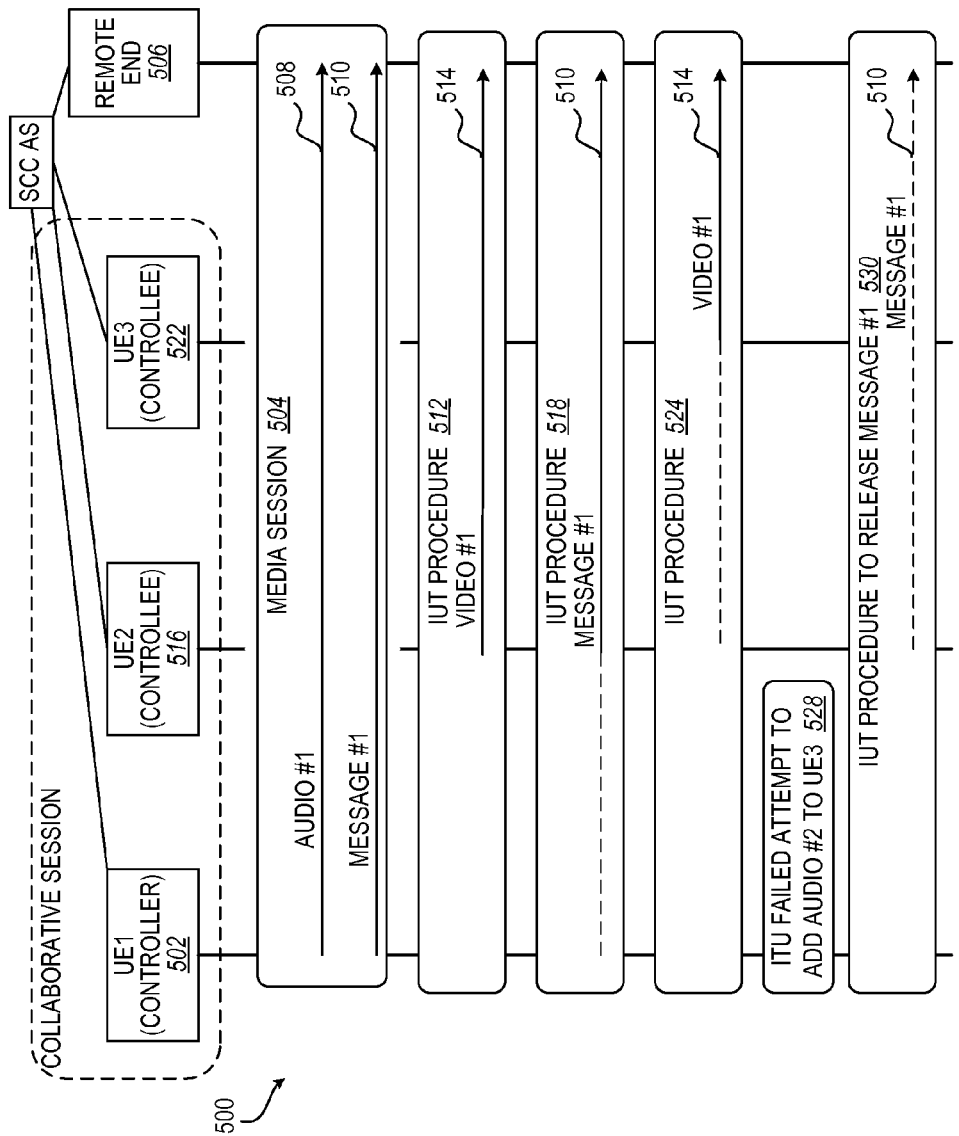
FIG. 3 illustrates a schematic diagram demonstrating a need for IMS IUT tracking.

In FIG. 3, an illustrative scenario 500 demonstrates a need for IMS IUT tracking of a media session. Initially only UE1 502 is having a session 504 with a remote end 506 with two media components audio #1 508 and message #1 510. In block 512, the UE1 502 uses IUT procedure to add another media component video #1 514 on a UE2 516.

UE1 502 transfers message #1 510 also to UE2 516 (block 518).

UE1 502 moves video #1 514 from UE2 516 to UE3 522 (block 524).

UE1 502 attempts to add audio #2 to UE3 522 but fails (block 528).

UE1 502 releases message #1 510 (block 530).

In one aspect, the present innovation discloses use of a new XML body to represent the media component information. The XML contains a structure for each media component:

```
<mc>
    <mc_index>index number</mc_index>
    <mc_type>media type </mc_type>
    <mc_status>status</mc_status>
    <mc_owner>media owner</mc_owner>
    <mc_dialog>The SIP dialog that controls this media</mc_dialog>
    ... other media attribute information such as direction, codec etc
</mc>
```

Where mc_index is an index value to identify the media component, which could be a numerical value or a random identifier. For each media component, this value is different.

mc_type indicates the type of the media: audio, video, text, etc.

mc_status indicates whether the media is active or terminated mc_owner indicates which UE owns the media component. The UE can be identified by identifies such as GRUU.

mc_dialog contains the SIP dialog identifier of the SIP dialog that is currently managing an active media component.

It should be appreciated with the benefit disclosure that the foregoing exemplary implementation is one way of organizing the information. There are other ways of organizing the same information, e.g., organizing the information per UE on the top level and for each UE lists the media components on a sub-level.

It should also be understood that the elements can be named differently while remaining consistent with aspects of the present disclosure.

In addition, some of the information can be represented as attributes for an element.

Further, a new Multipurpose Internet Mail Extensions (MIME) type can be defined for the innovative XML.

At least the controller UE, the SCC AS, or both need to maintain the information. The internal representation on these entities can be implementation dependent, but when exchanged between the SCC AS and the controller UE, the information can be represented such as by data structures disclosed herein.

In one aspect, the XML can be carried within any SIP messages exchanged between the SCC AS and the controller UE. For example, NOTIFY, MESSAGE, INFO, PUBLISH, INVITE, etc. A version number can be maintained for the overall XML file, so that when the SCC AS or the controller UE sends updated information to each other, they know which one is the latest version.

Various benefits can be realized using XML tracking, such as this generic approach can also be applied to cases where control of the collaborative session is transferred, there is no risk of losing synchronization between the SCC AS and the controller UE, and the same structure can also be used for other purposes. With regard to the latter, consider that the SCC AS can send this XML to the controller UE after the completion of each transfer operation to inform the controller UE the result of the transfer. In addition, the SCC AS can send this XML to the controller to indicate media component status if some of media has been removed by controllee UE.

Figure 4:
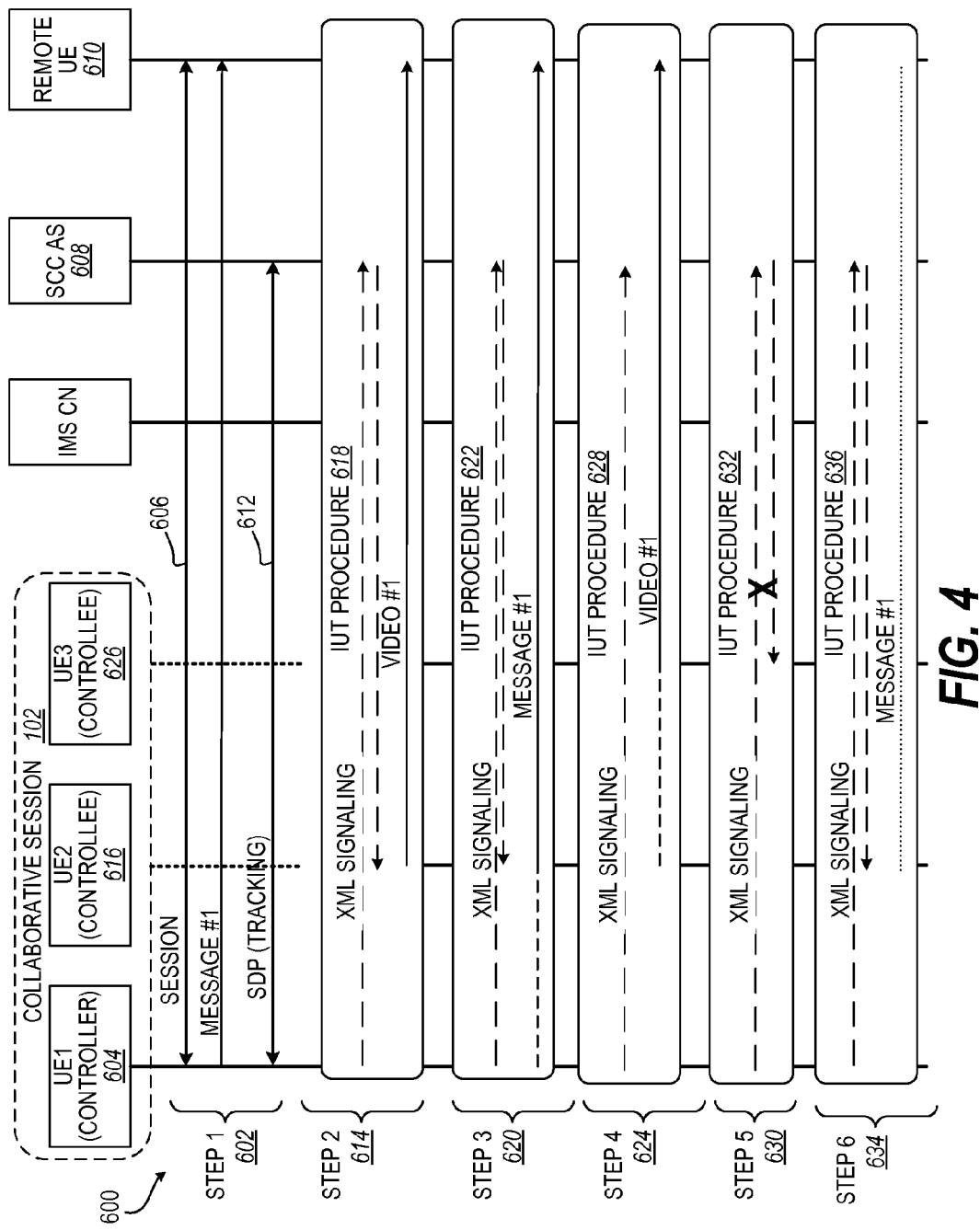
FIG. 4 illustrates an exemplary timing diagram for using an XML-based solution.

In FIG. 4, an example timing diagram 600 is depicted for using the XML-based solution. At first step depicted at 602, only UE1 604 is participating in a session 606 via a SCC AS 608 to a remote UE 610. In one aspect, there is no need to make use of the disclosed tracking structure as all the information can be conveyed using SDP as depicted at 612.

At a second step depicted at 614, video is added to UE2 616 using the IUT control mechanism as described in the previous sections. At the end of the IUT operation, UE1 604 and the SCC AS 608 exchange XML signaling as depicted at 618 to exchange media information. The exemplary XML can contain the following information:

```
<mc>
    <mc_index> 1 <mc_index>
    <mc_type> audio <mc_index>
    <mc_status> active <mc_status>
    <mc_owner> ID of UE1 <mc_ownder>
<mc>
<mc>
    <mc_index> 2 <mc_index>
    <mc_type> message <mc_index>
    <mc_status> active <mc_status>
    <mc_owner> ID of UE1 <mc_ownder>
<mc>
<mc>
    <mc_index> 3 <mc_index>
    <mc_type> video <mc_index>
    <mc_status> active <mc_status>
    <mc_owner> ID of UE2 <mc_ownder>
<mc>
```

At a third step depicted at 620, the message is moved from UE1 604 to UE2 616. At the end of the IUT operation, UE1 604 and the SCC AS 608 exchange XML signaling as depicted at 622 to exchange media information. Thus, the corresponding structure can be changed to:

```
<mc>
    <mc_index> 2 <mc_index>
    <mc_type> message <mc_index>
    <mc_status> active <mc_status>
    <mc_owner> IDofUE2 <mc_ownder>
<mc>
```

At a fourth step depicted at 624, video is moved from UE2 616 to UE3 626. At the end of the IUT operation, UE1 604 and the SCC AS 608 exchange XML signaling as depicted at 628 to exchange media information. The corresponding structure can be changed to:

```
<mc>
    <mc_index> 3 <mc_index>
    <mc_type> video <mc_index>
    <mc_status> active <mc_status>
    <mc_owner> IDofUE3 <mc_ownder>
<mc>
```

At a fifth step depicted at 630, an attempt by the UE1 604 to add another audio to UE3 626 fails, so no new information is added to the structure as depicted at 632.

At a sixth step depicted at 634, UE2 616 releases message component. UE1 604 and the SCC AS 608 exchange XML signaling as depicted at 636 to exchange media information. As a result, the corresponding structure can change to:

```
<mc>
  <mc_index> 2 <mc_index>
  <mc_type> message <mc_index>
  <mc_status> terminated <mc_status>
<mc>
```

Figure 5:
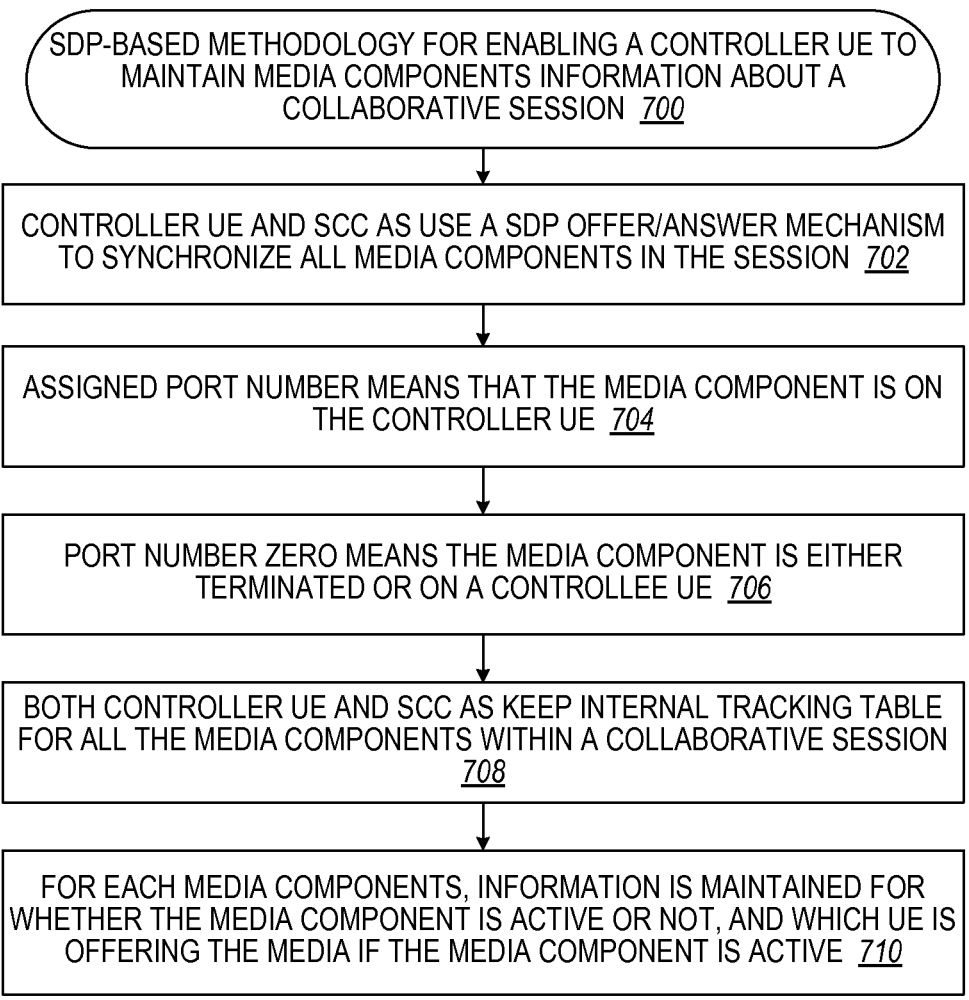
FIG. 5 illustrates a Session Description Protocol (SDP) based methodology that enables a controller UE to maintain media components information about a collaborative session.

In another aspect depicted in FIG. 5, a SDP-based methodology 700 enables a controller UE to maintain media components information about a collaborative session. In particular, the controller UE and a SCC AS use a SDP offer/answer mechanism to synchronize all media components in the session (block 702). To that end, an assigned port number is used to indicate whether the media component is on the controller UE (block 704) or not. A port number zero means that the media component is either terminated or is on a controllee UE (block 706). Both the controller UE and the SCC AS keep an internal tracking table for all the media components within a collaborative session (block 708).

In particular, for each media components, information is maintained for whether the media component is active or not, and which UE is offering the media if the media component is active (block 710).

Benefits for this approach can include that there is no need to have a new content body to carry the information. However, the controller UE and the SCC AS need to maintain the same internal information to avoid getting out of synchronization. In addition, it should be noted that this approach does not address control transfer cases.

Figure 6:
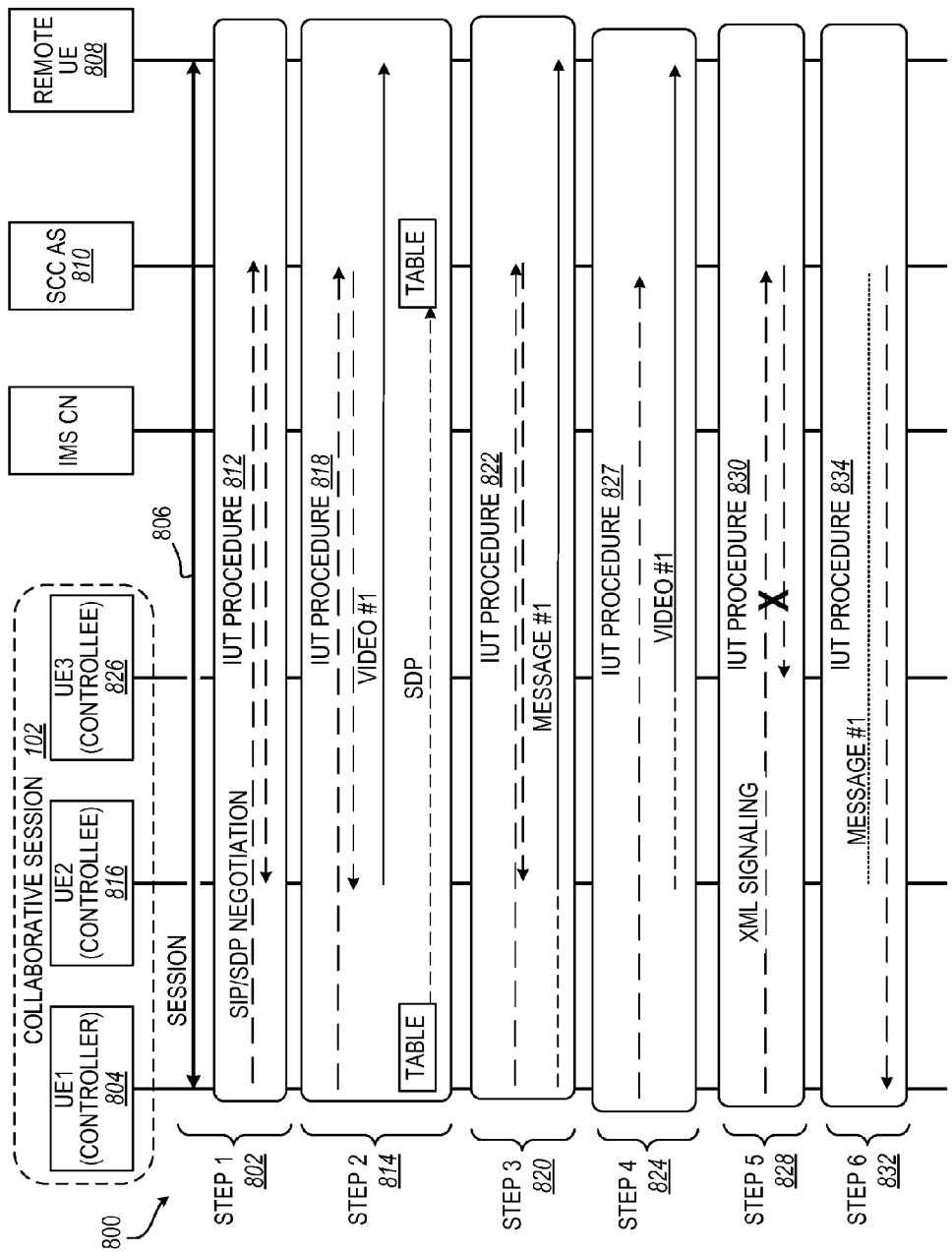
FIG. 6 illustrates an exemplary timing diagram for the SDP based IMS IUT media tracking in a collaborative session.

In FIG. 6, an exemplary timing diagram 800 is depicted for the SDP based IMS IUT media tracking in a collaborative session.

At a first step depicted at 802, only UE1 804 is in a session 806 with a remote UE 808 via a SCC AS 810, so no special handling is needed besides normal SIP/SDP negotiation (block 812). The SDP between UE1 804 and SCC AS 810 can follow the following structure (only media line info is shown):

```
...
m=audio 49170 RTP/AVP 97
...
m=message 49172 TCP/MSRP *
```

At a second step depicted at 814, video is added to UE2 816. The internal table and SDP between UE1 804 and SCC AS 810 can be updated to reflect this change (block 818), such as follows:

```
(1, audio, active, ID of UE1)
(2, message, active, ID of UE1)
(3, video, active, ID of UE2)
...
m=audio 49170 RTP/AVP 97
...
m=message 49172 TCP/MSRP *
...
m=video 0 RTP/AVP 98
```

At a third step depicted at 820, message is moved from UE1 804 to UE2 816 (block 822):

```
(1, audio, active, ID of UE1)
(2, message, active, IDofUE2)
(3, video, active, ID of UE2)
...
m=audio 49170 RTP/AVP 97
...
m=message 0 TCP/MSRP *
...
m=video 0 RTP/AVP 98
```

At a fourth step depicted at 824, video is moved from UE2 816 to UE3 826 (block 827):

```
(1, audio, active, ID of UE1)
(2, message, active, ID of UE2)
(3, video, active, IDofUE3)
...
m=audio 49170 RTP/AVP 97
...
m=message 0 TCP/MSRP *
...
m=video 0 RTP/AVP 98
```

At a fifth step depicted at 828, UE1 804 attempts to add another audio to UE3 826, but fails (block 830):

```
(1, audio, active, ID of UE1)
(2, message, active, ID of UE2)
(3, video, active, ID of UE3)
(4, audio, terminated)
...
m=audio 49170 RTP/AVP 97
...
m=message 0 TCP/MSRP *
...
m=video 0 RTP/AVP 98
...
m=audio 0 RTP/AVP *
```

At a sixth step depicted at 832, UE2 816 terminates message and UE1 804 gets notified (block 834):

```
(1, audio, active, ID of UE1)
(2, message, terminated)
(3, video, active, ID of UE3)
(4, audio, terminated)
...
m=audio 49170 RTP/AVP 97
...
m=message 0 TCP/MSRP *
...
m=video 0 RTP/AVP 98
...
m=audio 0 RTP/AVP *
```

Figure 7:
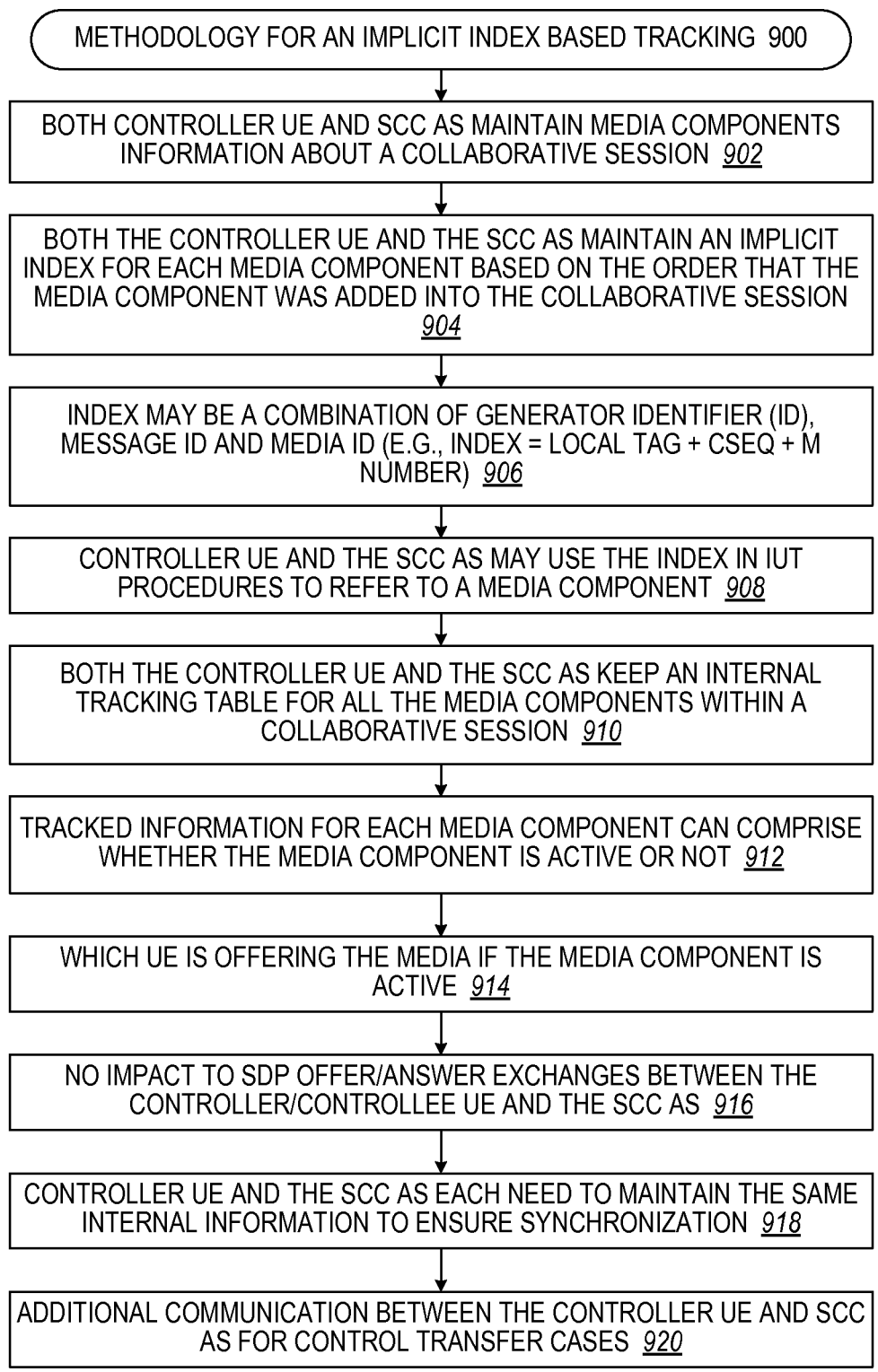
FIG. 7 illustrates a flow diagram of a methodology for implicit index based tracking.

In an additional aspect in FIG. 7, a methodology 900 is depicted for an implicit index based tracking. Both controller UE and SCC AS maintain media components information about a collaborative session (block 902). In an exemplary aspect, both the controller UE and the SCC AS maintain an implicit index for each media component based on the order that the media component was added into the collaborative session (block 904). Alternatively, the index may be a combination of generator identifier (ID), message ID and media ID (e.g., index=local tag+cseq+m number) (block 906).

The controller UE and the SCC AS may use the index in IUT procedures to refer to a media component (block 908).

Both the controller UE and the SCC AS keep an internal tracking table for all the media components within a collaborative session (block 910). In one aspect, the tracked information for each media component can comprise whether the media component is active or not (block 912) and which UE is offering the media if the media component is active (block 914).

One of the benefits of this approach can be that there is no impact to SDP offer/answer exchanges between the controller/controllee UE and the SCC AS (block 916). However, the controller UE and the SCC AS each need to maintain the same internal information to ensure synchronization (block 918). It should be noted that additional communication between the controller UE and SCC As can be required for control transfer cases (block 920).

Figure 8:
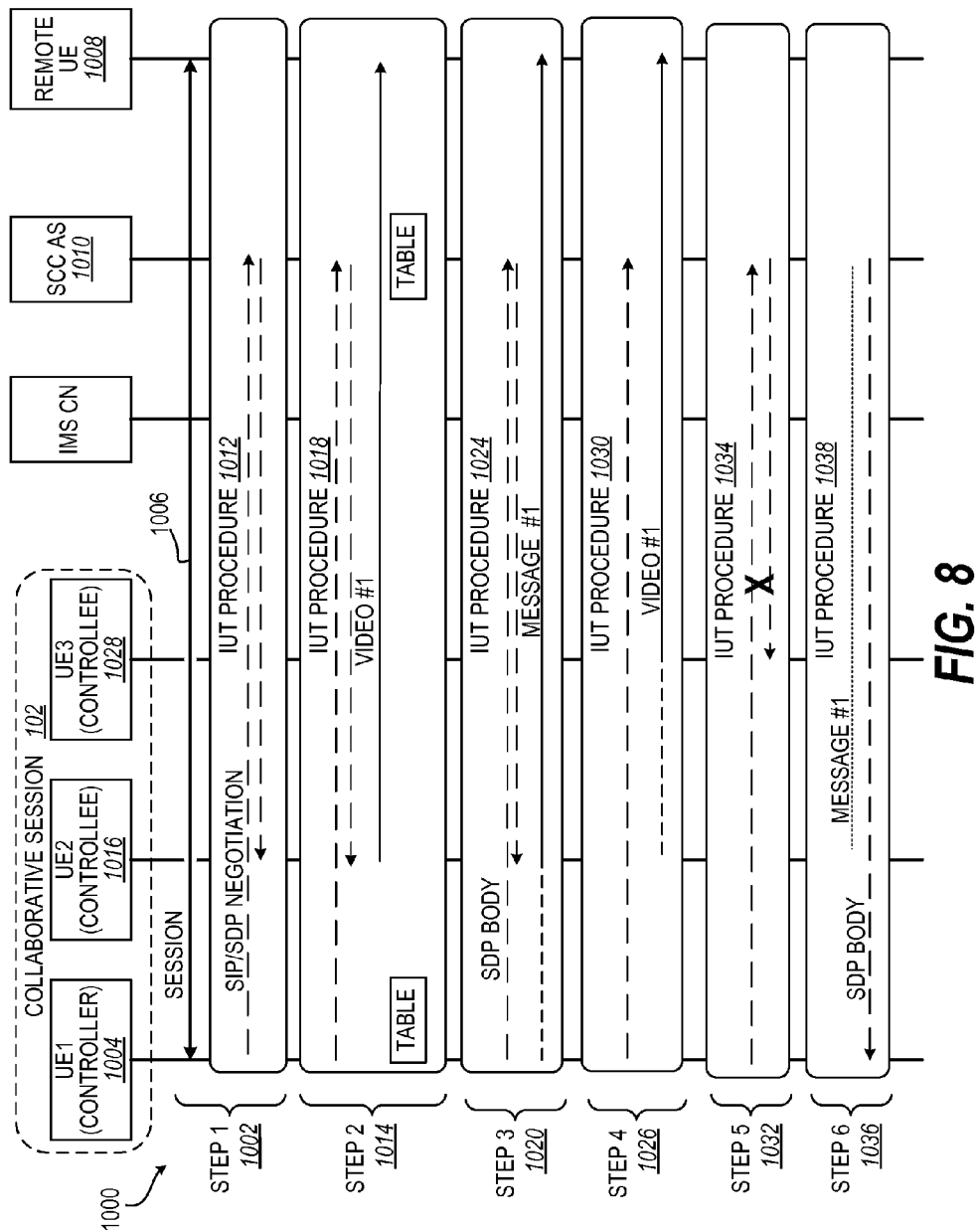
FIG. 8 illustrates a timing diagram for use of a SDP-based solution with implicit index tracking.

In FIG. 8, a timing diagram 1000 is depicted to illustrate use of SDP based solution with implicit index tracking.

At a first step depicted at 1002, only UE1 1004 is in a session 1006 with a remote UE 1008 via a SCC AS 1010. No special handling is needed besides normal SIP/SDP negotiation (block 1012). The SDP between UE1 1004 and SCC AS 1010 can follow the following structure (only media line info is shown):

---
...
m=audio 49170 RTP/AVP 97
...
m=message 49172 TCP/MSRP *

---

At a second step depicted at 1014, video is added to UE2 1016. The internal table and SDP between UE1 and SCC AS reflects the adding of video to UE2 (block 1018), such as follows:

---
(1, audio, active, ID of UE1)
(2, message, active, ID of UE1)
(3, video, active, ID of UE2)

---

At a third step depicted at 1020, message is moved from UE1 1004 to UE2 1016 by SDP body (block 1024), such as follows:

---
(1, audio, active, ID of UE1)
(2, message, active, <u>IDofUE2</u>)
(3, video, active, ID of UE2)
...
m=audio 49170 RTP/AVP 97
...
m=message 0 TCP/MSRP *

---

At a fourth step depicted at 1026, video is moved from UE2 1016 to UE3 1028 by SDP body (block 1030), such as follows:

---
(1, audio, active, ID of UE1)
(2, message, active, ID of UE2)
(3, video, active, <u>IDofUE3</u>)
...
m=audio 49170 RTP/AVP 97
...
m=message 0 TCP/MSRP *

---

At a fifth step depicted at 1032, UE1 1004 attempts to add another audio to UE3 1028, but fails (block 1034), such as follows:

---
(1, audio, active, ID of UE1)
(2, message, active, ID of UE2)
(3, video, active, ID of UE3)
(4, audio, terminated) - this entry is optional if both UE1 and SCC AS understand that failed addition does not need to be maintained.
...
m=audio 49170 RTP/AVP 97
...
m=message 0 TCP/MSRP *

---

At a sixth step depicted at 1036, UE2 1016 terminates message and UE1 1004 gets notified by SDP body (block 1038):

---
(1, audio, active, ID of UE1)
(2, message, <u>terminated</u>)
(3, video, active, ID of UE3)
(4, audio, terminated)
...
m=audio 49170 RTP/AVP 97
...
m=message 0 TCP/MSRP *

---

It should be appreciated with the benefit of the present disclosure that the three alternatives for the controller UE and SCC AS to track the media are not necessarily mutually exclusive. For example, either the second or third alternative (i.e., SIP header and SDP body) can be used for IUT transfer without service control transfer. The first alternative of XML can be used in addition for IUT with service control transfer.

Figure 9:
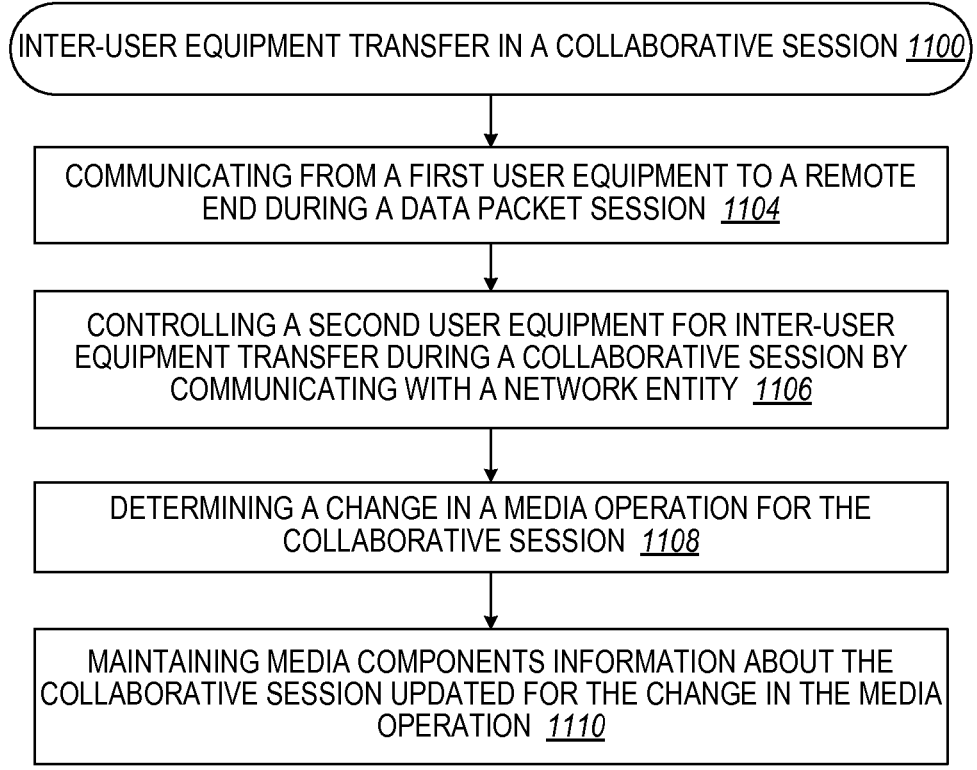
FIG. 9 illustrates a flow diagram for a methodology for user equipment to perform IUT for a collaborative session.

In FIG. 9, a methodology 1100 is depicted for IUT in a collaborative session. A first user equipment communicates to a remote end during a data packet session (block 1104). The first user equipment controls a second user equipment for IUT during a collaborative session by communicating with a network entity (block 1106). The first user equipment determines a change in a media operation for the collaborative session (block 1108). The first user equipment maintains media components information about the collaborative session updated for the change in the media operation (block 1110).

Figure 10:
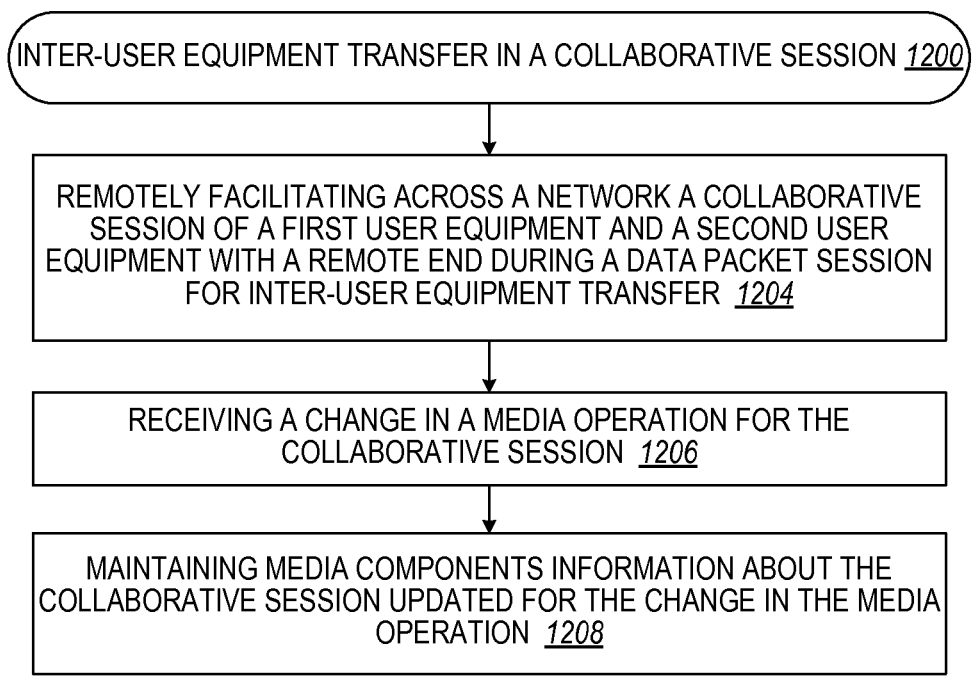
FIG. 10 illustrates a flow diagram for a methodology for a network to perform IUT for a collaborative session.

In FIG. 10, methodology 1200 is depicted for inter-user equipment transfer in a collaborative session. A network entity remotely facilitates across a network a collaborative session of a first user equipment and a second user equipment with a remote end during a data packet session for IUT (block 1204). The network entity receives a change in a media operation for the collaborative session (block 1206). The network entity maintains media components information about the collaborative session updated for the change in the media operation (block 1208).

Figure 11:
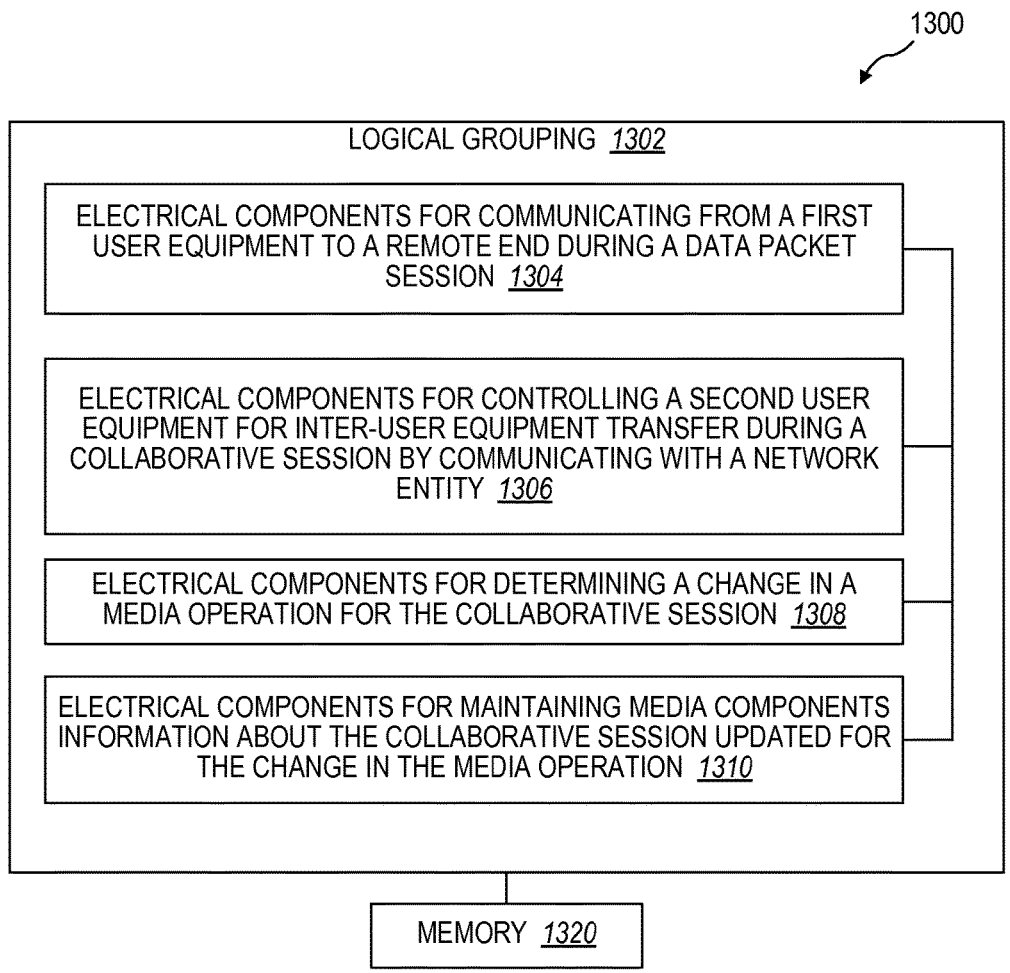
FIG. 11 illustrates a block diagram of a logical grouping of electrical components for IUT for a collaborative session that is incorporated at least in part in user equipment.

With reference to FIG. 11, illustrated is a system 1300 for inter-user equipment transfer in a collaborative session. For example, system 1300 can reside at least partially within user equipment (UE). It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for communicating from a first user equipment to a remote end during a data packet session 1304. Moreover, logical grouping 1302 can include an electrical component for controlling a second user equipment for inter-user equipment transfer during a collaborative session by communicating with a network entity 1306. For another instance, logical grouping 1302 can include an electrical component for determining a change in a media operation for the collaborative session 1308. For an additional instance, logical grouping 1302 can include an electrical component for maintaining media components information about the collaborative session updated for the change in the media operation 1310. Additionally, system 1300 can include a memory 1320 that retains instructions for executing functions associated with electrical components 1304-1310. While shown as being external to memory 1320, it is to be understood that one or more of electrical components 1304-1310 can exist within memory 1320.

Figure 12:
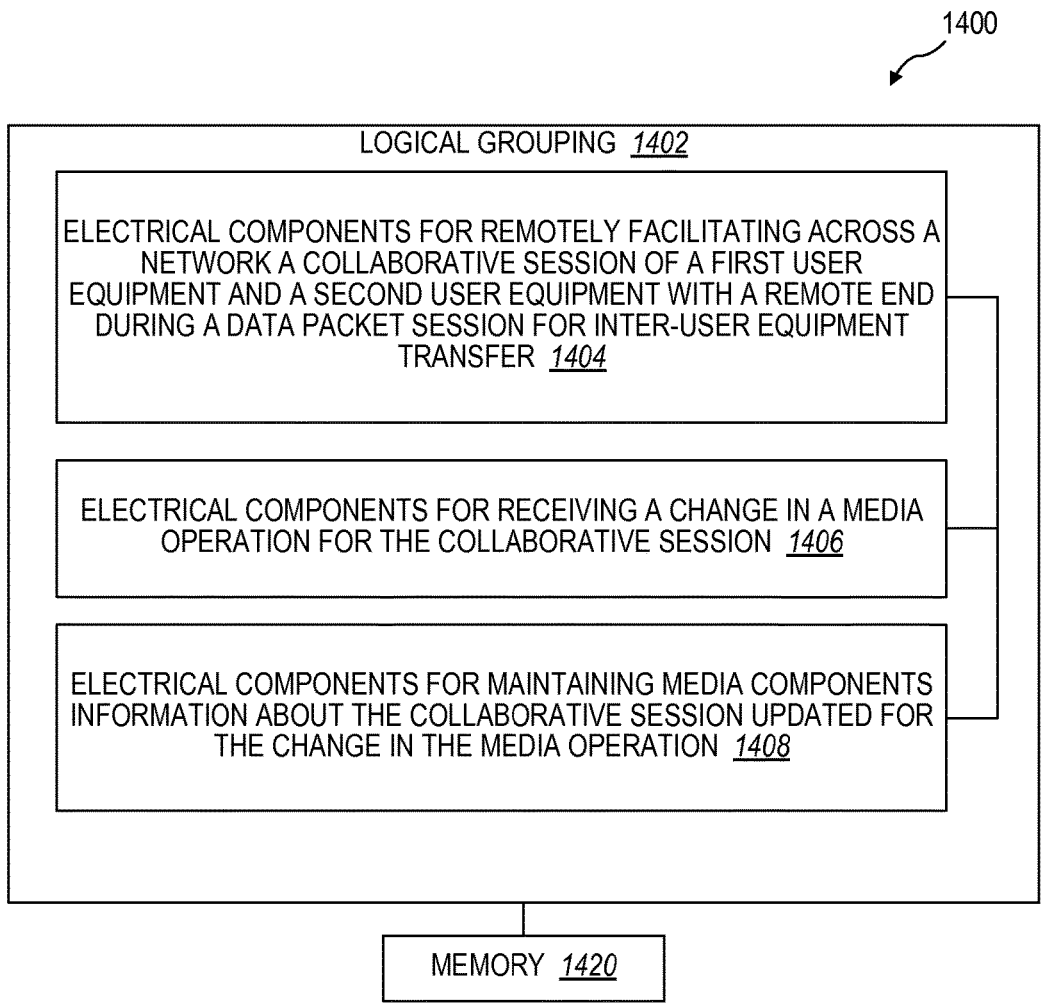
FIG. 12 illustrates a block diagram of a logical grouping of electrical components for IUT for a collaborative session that is incorporated at least in part in a node.

With reference to FIG. 12, illustrated is a system 1400 for inter-user equipment transfer in a collaborative session. For example, system 1400 can reside at least partially within a network entity (e.g., application server). It is to be appreciated that system 1400 is represented as including functional blocks, which can be functional blocks that represent functions implemented by a computing platform, processor, software, or combination thereof (e.g., firmware). System 1400 includes a logical grouping 1402 of electrical components that can act in conjunction. For instance, logical grouping 1402 can include an electrical component for remotely facilitating across a network a collaborative session of a first user equipment and a second user equipment with a remote end during a data packet session for inter-user equipment transfer 1404. Moreover, logical grouping 1402 can include an electrical component for receiving a change in a media operation for the collaborative session 1406. In addition, logical grouping 1402 can include an electrical component for maintaining media components information about the collaborative session updated for the change in the media operation 1408. Additionally, system 1400 can include a memory 1420 that retains instructions for executing functions associated with electrical components 1404-1408. While shown as being external to memory 1420, it is to be understood that one or more of electrical components 1404-1408 can exist within memory 1420.

Figure 13:
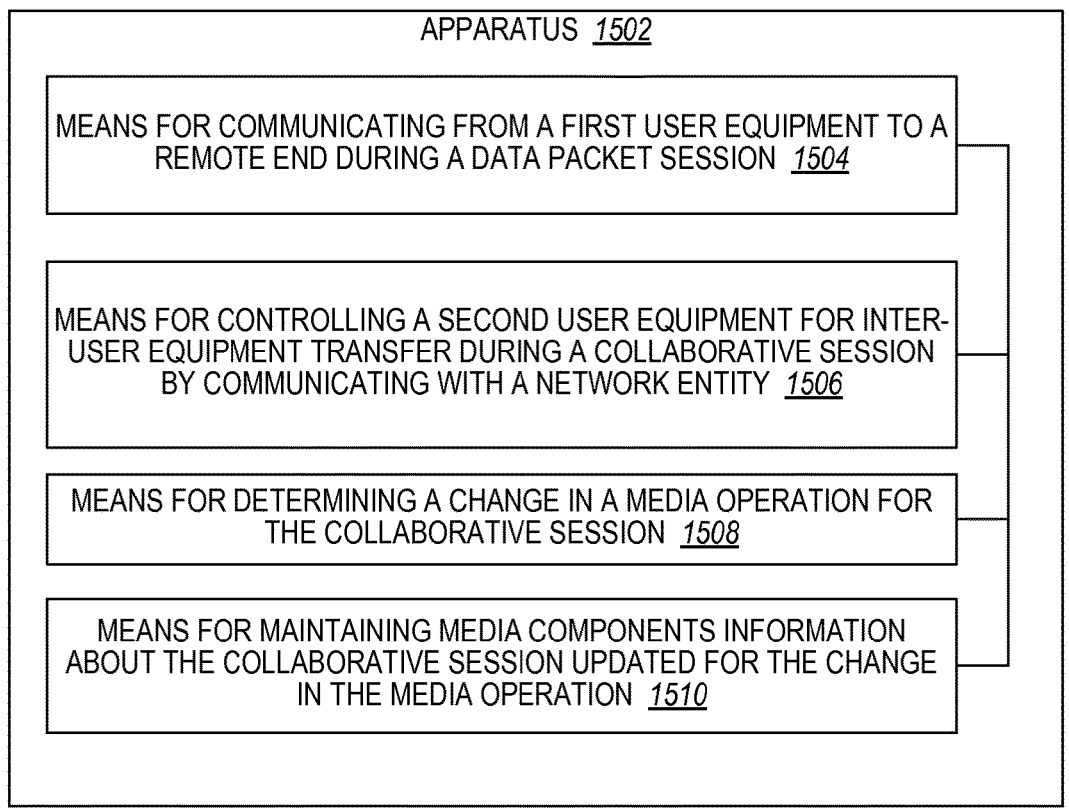
FIG. 13 illustrates a block diagram of an apparatus having means for IUT for a collaborative session by user equipment.

In FIG. 13, an apparatus 1502 is depicted for inter-user equipment transfer in a collaborative session. Means 1504 are provided for communicating from a first user equipment to a remote end during a data packet session. Means 1506 are provided for controlling a second user equipment for inter-user equipment transfer during a collaborative session by communicating with a network entity. Means 1508 are provided for determining a change in a media operation for the collaborative session. Means 1510 are provided for maintaining media components information about the collaborative session updated for the change in the media operation.

Figure 14:
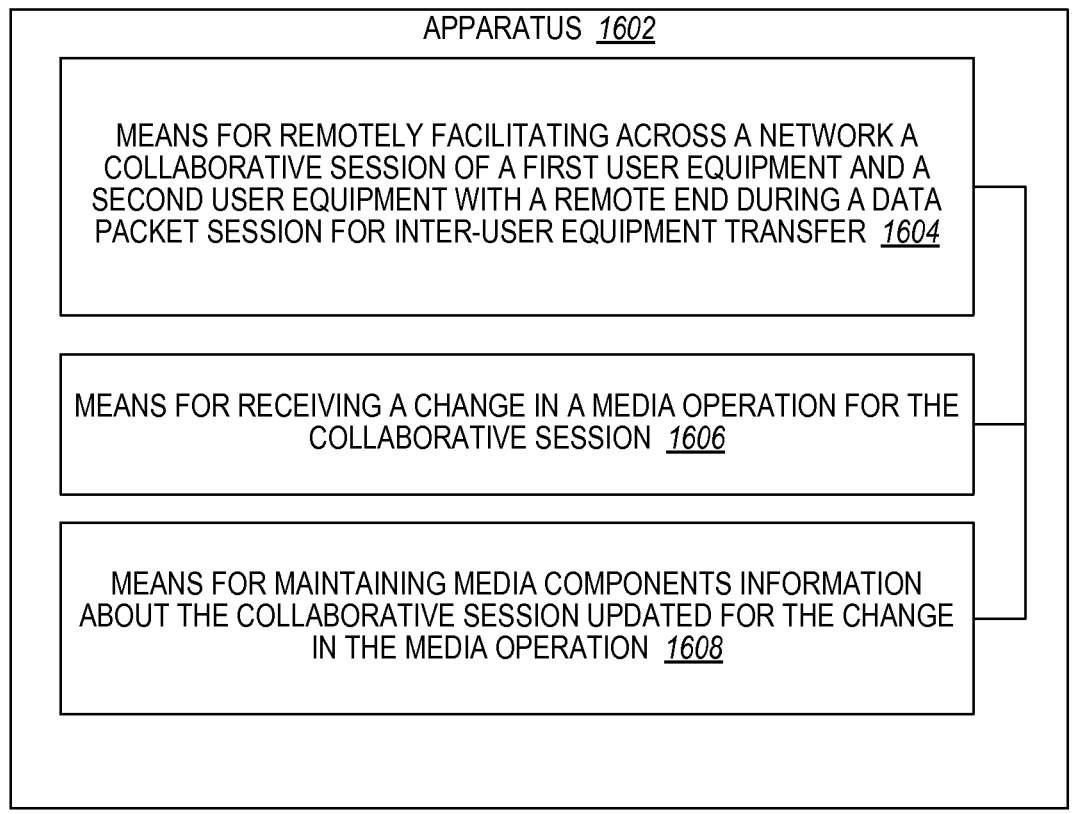
FIG. 14 illustrates a block diagram of an apparatus having means for IUT for a collaborative session by a network entity.

In FIG. 14, an apparatus 1602 is depicted for inter-user equipment transfer in a collaborative session. Means 1604 are provided for remotely facilitating across a network a collaborative session of a first user equipment and a second user equipment with a remote end during a data packet session for inter-user equipment transfer. Means 1606 are provided for receiving a change in a media operation for the collaborative session. Means 1608 are provided for maintaining media components information about the collaborative session updated for the change in the media operation.

Figure 15:
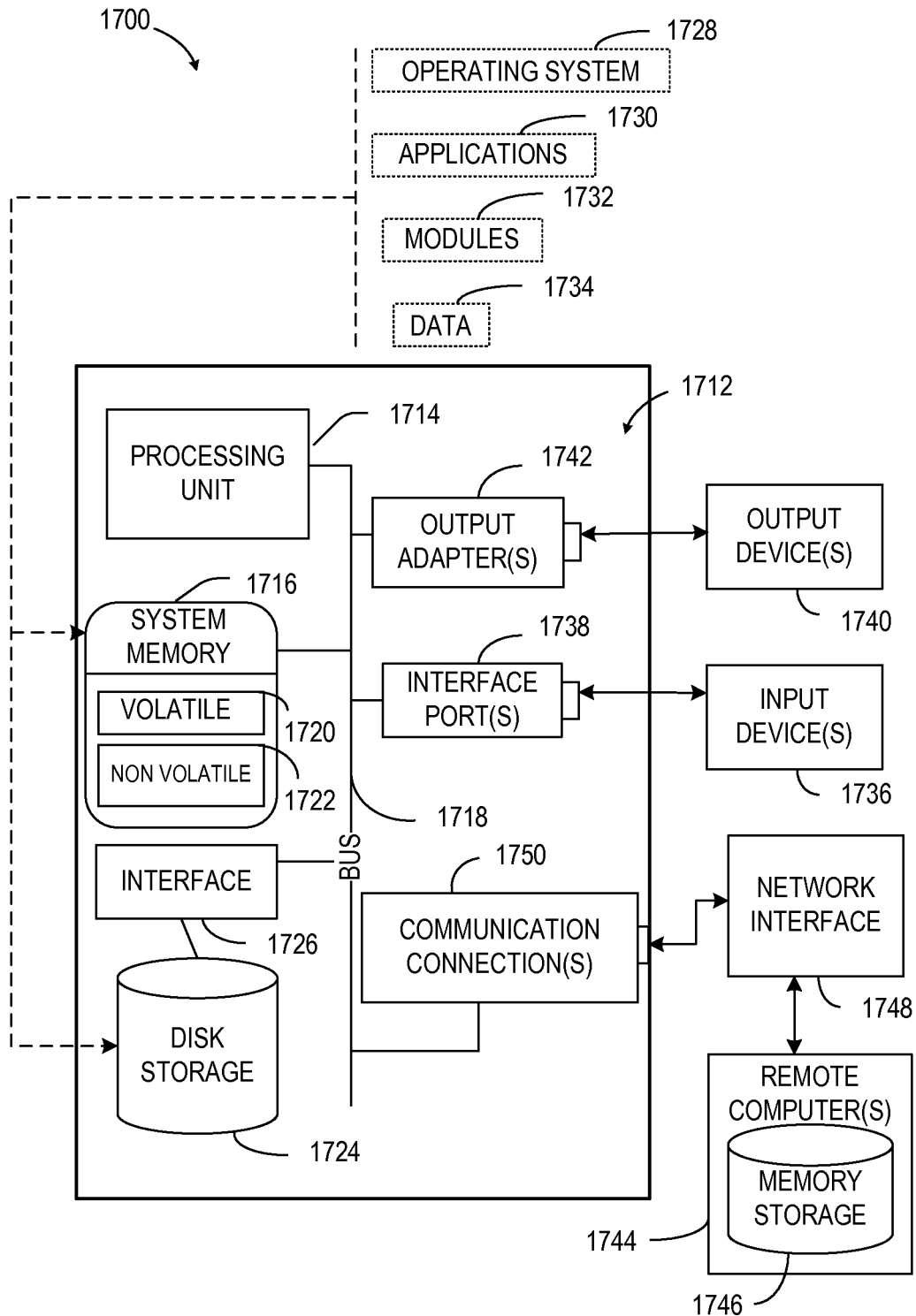
FIG. 15 illustrates a diagram of an exemplary computing environment.

With reference to FIG. 15, an exemplary computing environment 1700 for implementing various aspects of the claimed subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1794), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), or flash memory. Volatile memory 1720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 also includes removable/non-removable, volatile/non-volatile computer storage media. FIG. 15 illustrates, for example, disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 15 describes software that acts as an intermediary between users and the basic computer resources described in the suitable operating environment 1700. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the claimed subject matter can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712 and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 16:
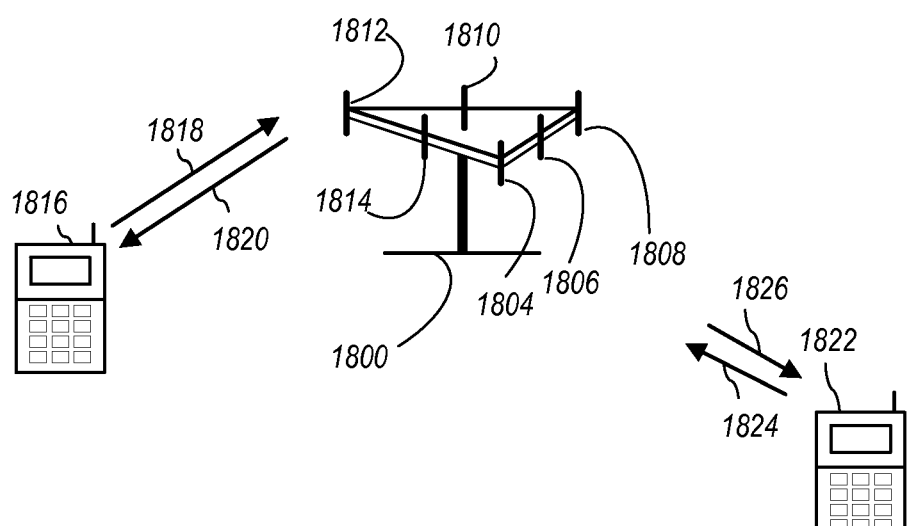
FIG. 16 illustrates a diagram of a multiple access wireless communication system.

Referring to FIG. 16, a multiple access wireless communication system according to one aspect is illustrated. An access point (AP) 1800 includes multiple antenna groups, one including 1804 and 1806, another including 1808 and 1810, and an additional including 1812 and 1814. In FIG. 16, only two antennas are shown for each antenna group, however, more or fewer antennas may be utilized for each antenna group. Access terminal (AT) 1816 is in communication with antennas 1812 and 1814, where antennas 1812 and 1814 transmit information to access terminal 1816 over forward link 1820 and receive information from access terminal 1816 over reverse link 1818. Access terminal 1822 is in communication with antennas 1806 and 1808, where antennas 1806 and 1808 transmit information to access terminal 1822 over forward link 1826 and receive information from access terminal 1822 over reverse link 1824. In a FDD system, communication links 1818, 1820, 1824 and 1826 may use different frequencies for communication. For example, forward link 1820 may use a different frequency then that used by reverse link 1818.

Each group of antennas and/or the area in which they are designed to communicate is often referred to as a sector of the access point. In the aspect, antenna groups each are designed to communicate to access terminals in a sector, of the areas covered by access point 1800.

In communication over forward links 1820 and 1826, the transmitting antennas of access point 1800 utilize beamforming in order to improve the signal-to-noise ratio of forward links for the different access terminals 1816 and 1822. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 17:
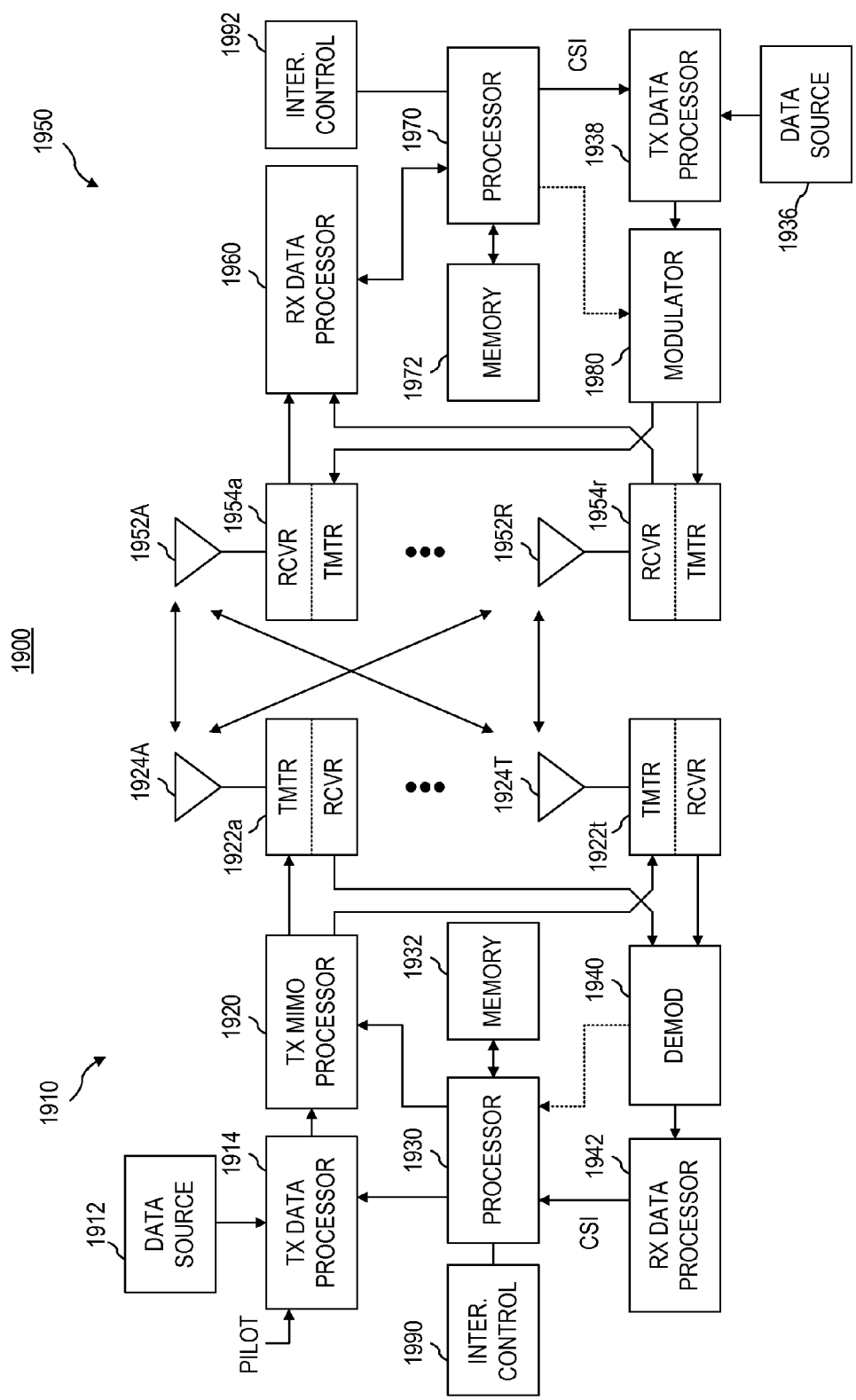
FIG. 17 illustrates a schematic of a multiple input multiple output (MIMO) communication system.

The teachings herein may be incorporated into a node (e.g., a device) employing various components for communicating with at least one other node. FIG. 17 depicts several sample components that may be employed to facilitate communication between nodes. Specifically, FIG. 17 illustrates a wireless device 1910 (e.g., an access point) and a wireless device 1950 (e.g., an access terminal) of a MIMO system 1900. At the device 1910, traffic data for a number of data streams is provided from a data source 1912 to a transmit ("TX") data processor 1914.

In some aspects, each data stream is transmitted over a respective transmit antenna. The TX data processor 1914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., BPSK, QSPK, M-PSK, or M-QAM) selected for that data stream to provide modulation symbols. The data rate, coding, and modulation for each data stream may be determined by instructions performed by a processor 1930. A data memory 1932 may store program code, data, and other information used by the processor 1930 or other components of the device 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers ("XCVR") 1922a through 1922t that each has a transmitter (TMTR) and receiver (RCVR). In some aspects, the TX MIMO processor 1920 applies beamforming weights to the symbols of the data streams and to the antenna from which the symbol is being transmitted.

Each transceiver 1922a-1922t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1922a through 1922t are then transmitted from $N_T$ antennas 1924a through 1924t, respectively.

At the device 1950, the transmitted modulated signals are received by $N_R$ antennas 1952a through 1952r and the received signal from each antenna 1952a-1952r is provided to a respective transceiver ("XCVR") 1954a through 1954r. Each transceiver 1954a-1954r conditions (e.g., filters, amplifies, and downconverts) a respective received signal, digitizes the conditioned signal to provide samples, and further processes the samples to provide a corresponding "received" symbol stream.

A receive ("RX") data processor 1960 then receives and processes the $N_R$ received symbol streams from $N_R$ transceivers 1954a-1954r based on a particular receiver processing technique to provide $N_T$ "detected" symbol streams. The RX data processor 1960 then demodulates, deinterleaves, and decodes each detected symbol stream to recover the traffic data for the data stream. The processing by the RX data processor 1960 is complementary to that performed by the TX MIMO processor 1920 and the TX data processor 1914 at the device 1910.

A processor 1970 periodically determines which precoding matrix to use. The processor 1970 formulates a reverse link message comprising a matrix index portion and a rank value portion. A data memory 1972 may store program code, data, and other information used by the processor 1970 or other components of the device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954a through 1954r, and transmitted back to the device 1910.

At the device 1910, the modulated signals from the device 1950 are received by the antennas 1924a-1924t, conditioned by the transceivers 1922a-1922t, demodulated by a demodulator ("DEMOD") 1940, and processed by a RX data processor 1942 to extract the reverse link message transmitted by the device 1950. The processor 1930 then determines which pre-coding matrix to use for determining the beamforming weights then processes the extracted message.

FIG. 17 also illustrates that the communication components may include one or more components that perform interference control operations. For example, an interference ("INTER.") control component 1990 may cooperate with the processor 1930 and/or other components of the device 1910 to send/receive signals to/from another device (e.g., device 1950). Similarly, an interference control component 1992 may cooperate with the processor 1970 and/or other components of the device 1950 to send/receive signals to/from another device (e.g., device 1910). It should be appreciated that for each device 1910 and 1950 the functionality of two or more of the described components may be provided by a single component. For example, a single processing component may provide the functionality of the interference control component 1990 and the processor 1930 and a single processing component may provide the functionality of the interference control component 1992 and the processor 1970.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

What is claimed is:

1. A method executable by a first user equipment (UE) for an inter-UE inter transfer in a collaborative session between at least a first UE and a remote end, comprising:
   communicating from the first UE, via a network entity, to the remote end during the collaborative session;
   controlling a second UE user equipment during the collaborative session to communicate, via the network entity, with the remote end in the collaborative session, wherein controlling the second UE is based at least in part on initiating, via communicating with a Service Centralization and Continuity (SCC) application server, the inter-UE transfer to transfer at least one media operation of the collaborative session with the remote end to the second UE; and
   maintaining media components information about the collaborative session updated for a change in the at least one media operation, comprising: exchanging, between the first UE and the SCC application server in accordance with the change in the at least one media operation and after completion of the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

2. The method of claim 1, wherein maintaining the media components information further comprises determining whether the media component is active and identifying that either the first UE or the second UE is offering the media component when the media component is active.

3. The method of claim 1, wherein the first UE acts in a role as a controller device of the collaborative session, and the SDP message further includes information about a media index, a media status and an owner of the media component.

4. The method of claim 1, wherein maintaining the media components information further comprises exchanging between the first UE and the SCC application server a structured Extensible Markup Language (XML) message, wherein the structured XML message includes information about a media index, the type of media, a media status and an owner of the media component.

5. The method of claim 4, wherein the media index comprises one or more of a group consisting of an identifier of the structured XML message that caused media to be added to the collaborative session, a media index number contained within a Session Description Protocol (SDP) message body, and an identification of an originator of the structured XML message that added a media component to the collaborative session.

6. The method of claim 1, wherein an owner of the media component is derived by the controller device and the SCC application server based on an outcome of a previous inter-UE inter user equipment transfer operation.

7. The method of claim 1, further comprising:
communicating the change in the at least one media operation using signaling contained in a Session Initiation Protocol (SIP) header.

8. The method of claim 7, wherein the SCC application server separately tracks the change using the sequential index.

9. The method of claim 8, wherein the sequential index comprises a generator identifier, a message identifier and a media identifier.

10. The method of claim 1, wherein the synchronizing tracking between the first UE and the SCC application server uses a Session Description Protocol (SDP) offer/answer mechanism.

11. The method of claim 1, wherein maintaining the media components information further comprises tracking a media direction attribute.

12. The method of claim 1, wherein maintaining the media components information further comprises indicating that a bi-directional media component comprises a plurality of unidirectional media components respectively terminated at a different UE.

13. At least one processor comprising hardware, of a first user equipment (UE), for an inter-UE transfer in a collaborative session between at least a first UE and a remote end, the at least one processor configured for:
communicating from the first UE, via a network entity, user equipment to the remote end during the collaborative session;
controlling a second UE during the collaborative session to communicate, via the network entity, with the remote end in the collaborative session, wherein controlling the second UE is based at least in part on initiating, via communicating with a Service Centralization and Continuity (SCC) application server, the inter-UE transfer to transfer at least one media operation of the collaborative session with the remote end to the second UE; and
maintaining media components information about the collaborative session updated for a change in the at least one media operation, comprising: exchanging, between the first UE and the SCC application server in accordance with the change in the at least one media operation and after completion of the inter-UE transfer, a Session Description Protocol (SDP) message configured to indicate an update to the media components information for a media component in the collaborative session, wherein the SDP message includes at least an indication of a type of media associated with the media component, wherein a memory is coupled to the at least one processor, wherein the SDP message specifies a special port number to indicate whether the media component is owned by the controller device or the second UE user equipment acting in a role as a controllee device, and the special port number used to indicate ownership of the media component is different from an actual port number used by the media component.

14. A non-transitory computer-readable storage medium storing codes executable by a first user equipment (UE) for an inter-UE transfer in a collaborative session between at least a first UE and a remote end, the codes comprising:
a first set of codes for causing a computer to communicate from the first UE, via a network entity, to the remote end during the collaborative session;
a second set of codes for causing the computer to control a second UE during the collaborative session to communicate, via the network entity, with the remote end in the collaborative session, wherein controlling the second UE is based at least in part on initiating, with a Service Centralization and Continuity (SCC) application server, the inter-UE transfer to transfer at least one media operation of the collaborative session with the remote end to the second UE; and
a third set of codes for causing the computer to maintain media components information about the collaborative session updated for a change in the at least one media operation, comprising: exchanging, between the first UE and the SCC application server in accordance with the change in the at least one media operation and after completion of the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

15. An apparatus of a first user equipment (UE) configured for an inter-UE transfer in a collaborative session between at least a first UE and a remote end, comprising:
a transceiver for communicating from the first UE, via a network entity, to the remote end during the collaborative session; and
a computing platform for:
controlling, via the transceiver, a second UE during the collaborative session to communicate with the remote end in the collaborative session, wherein controlling the second UE is based at least in part on initiating, via communicating with a Service Centralization and Continuity (SCC) application server, the inter-UE transfer to transfer at least one media operation of the collaborative session with the remote end to the second UE, and
maintaining media components information about the collaborative session updated for a change in the at least one media operation, comprising: exchanging, between the first UE and the SCC application server in accordance with the change in the at least one media operation and after completion of the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

16. The apparatus of claim 15, wherein the computing platform is further for maintaining the media components information by determining whether the media component is active and identifying that either the first UE or second UE is offering the media component when the media component is active.

17. The apparatus of claim 15, wherein the first UE acts in a role as a controller device of the collaborative session, and the SDP message further includes information about a media index, a media status and an owner of the media component.

18. The apparatus of claim 15, wherein the computing platform is further for maintaining the media components information by exchanging between the first UE and the SCC application server a structured Extensible Markup Language (XML) message, wherein the structured XML message includes information about a media index, the type of media, a media status and an owner of the media component.

19. The apparatus of claim 18, wherein the media index comprises one or more of a group consisting of an identifier of the structured XML message that caused media to be added to the collaborative session, a media index number contained within a Session Description Protocol (SDP) message body, and an identification of an originator of the structured XML message that added a media component to the collaborative session.

20. The apparatus of claim 15, wherein an owner of the media component is derived by the controller device and the SCC application server based on an outcome of a previous inter-UE inter user equipment transfer operation.

21. The apparatus of claim 15, wherein the computing platform is further for:
communicating the change in the at least one media operation using signaling contained in a Session Initiation Protocol (SIP) header.

22. The apparatus of claim 21, wherein the SCC application server separately tracks the change using the sequential index.

23. The apparatus of claim 22, wherein the sequential index comprises a generator identifier, a message identifier and a media identifier.

24. The apparatus of claim 15, wherein the synchronizing tracking between the first UE and the SCC application server uses a Session Description Protocol (SDP) offer/answer mechanism.

25. The apparatus of claim 15, wherein the computing platform is further for maintaining the media components information by tracking a media direction attribute.

26. The apparatus of claim 15, wherein the computing platform is further for maintaining the media components information by indicating that a bi-directional media component comprises a plurality of unidirectional media components respectively terminated at a different UE.

27. A method executable by a network entity for an inter-user equipment (UE) transfer in a collaborative session, comprising:
remotely facilitating, across a network, the collaborative session of a first UE and a second UE to communicate with a remote end, wherein the collaborative session is based at least in part on initiating the inter-UE transfer that is communicated with the first UE to transfer at least one media operation of the collaborative session with the remote end to the second UE: and
maintaining media components information about the collaborative session updated for a change in the at least one media operation, comprising: exchanging, between the first UE and a Service Centralization and Continuity (SCC) application server in accordance with the change in the at least one media operation and after the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

28. The method of claim 27, wherein maintaining the media components information further comprises determining whether the media component is active and identifying that either the first UE or second UE is offering the media component when the media component is active.

29. The method of claim 27, wherein the first UE acts in a role as a controller device of the collaborative session, and the SDP message includes information about a media index, a media status and an owner of the media component.

30. The method of claim 27, wherein maintaining the media components information further comprises exchanging between the first UE and the SCC application server a structured Extensible Markup Language (XML) message, wherein the structured XML message includes information about a media index, the type of media, a media status and an owner of the media component.

31. The method of claim 30, wherein the media index comprises one or more of a group consisting of an identifier of the structured XML message that caused media to be added to the collaborative session, a media index number contained within a Session Description Protocol (SDP) message body, and an identification of an originator of the structured XML message that added a media component to the collaborative session.

32. The method of claim 27, wherein an owner of the media component is derived by the controller device and the SCC application server based on an outcome of a previous inter-UE inter user equipment transfer operation.

33. The method of claim 27, further comprising:
communicating the change in the at least one media operation using signaling contained in a Session Initiation Protocol (SIP) header.

34. The method of claim 33, wherein the first UE separately tracks the change using the sequential index.

35. The method of claim 34, wherein the sequential index comprises a generator identifier, a message identifier and a media identifier.

36. The method of claim 27, wherein the synchronizing tracking between the first UE and the SCC application server uses a Session Description Protocol (SDP) offer/answer mechanism.

37. The method of claim 27, wherein maintaining the media components information further comprises tracking a media direction attribute.

38. The method of claim 27, wherein maintaining the media components information further comprises indicating that a bi-directional media component comprises a plurality of unidirectional media components respectively terminated at a different UE.

39. At least one processor comprising hardware, of a network entity, for an inter-user equipment UE transfer in a collaborative session, the at least one processor configured for:
  remotely facilitating, across a network the collaborative session of a first UE and a second UE to communicate with a remote end, wherein the collaborative session is based at least in part on initiating the inter-UE transfer that is communicated with the first UE to transfer at least one media operation of the collaborative session with the remote end to the second UE: and
  maintaining media components information about the collaborative session updated for the change in the at least one media operation, comprising: exchanging, between the first UE and a Service Centralization and Continuity (SCC) application server in accordance with the change in the at least one media operation and after the inter-UE transfer, a Session Description Protocol (SDP) message configured to indicate an update to the media components information for a media component in the collaborative session, wherein the SDP message includes at least an indication of a type of media associated with the media component,
  wherein a memory is coupled to the at least one processor, and wherein the SDP message specifies a special port number to indicate whether the media component is owned by the controller device or the second UE user equipment acting in a role as a controllee device, and the special port number used to indicate ownership of the media component is different from an actual port number used by the media component.

40. A non-transitory computer-readable storage medium storing codes executable by a network entity for an inter-user equipment (UE) transfer in a collaborative session, the codes comprising:
  a first set of codes for causing a computer to remotely facilitate, across a network, the collaborative session of a first UE and a second UE to communicate with a remote, wherein the collaborative session is based at least in part on initiating the inter-UE transfer that is communicated with the first UE to transfer at least one media operation of the collaborative session with the remote end to the second UE: and
  a second set of codes for causing the computer to maintain media components information about the collaborative session updated for the change in the at least one media operation, comprising: exchanging, between the first UE and a Service Centralization and Continuity (SCC) application server in accordance with the change in the at least one media operation and after the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

41. An apparatus of a network entity configured for an inter-user equipment (UE) transfer in a collaborative session, comprising:
  a network interface for remotely facilitating, across a network, the collaborative session of a first UE and a second UE to communicate with a remote end, wherein the collaborative session is based at least in part on initiating the inter-UE transfer that is communicated with the first UE to transfer at least one media operation of the collaborative session with the remote end to the second UE: and
  a computing platform for maintaining media components information about the collaborative session updated for a change in the at least one media operation, comprising: exchanging, between the first UE and a Service Centralization and Continuity (SCC) application server in accordance with the change in the at least one media operation and after the inter-UE transfer, a Session Description Protocol (SDP) message configured to indicate an update to the media components information for a media component in the collaborative session, wherein the SDP message includes at least an indication of a type of media associated with the media component, wherein the SDP message specifies a special port number to indicate whether the media component is owned by the controller device or the second UE user equipment acting in a role as a controllee device, and the special port number used to indicate ownership of the media component is different from an actual port number used by the media component.

42. The apparatus of claim 41, wherein the computing platform is further for maintaining the media components information by determining whether the media components is active and identifying either the first UE or second UE is offering the media component when the media component is active.

43. The apparatus of claim 41, wherein the first UE acts in a role as a controller device of the collaborative session, and the SDP message includes information about a media index, a media status and an owner of the media component.

44. The apparatus of claim 41, wherein the computing platform is further for maintaining the media components information by exchanging between the first UE and the SCC application server a structured Extensible Markup Language (XML) message, wherein the structured XML message includes information about a media index, the type of media, a media status and an owner of the media component.

45. The apparatus of claim 44, wherein the media index comprises one or more of a group consisting of an identifier of the structured XML message that caused media to be added to the collaborative session, a media index number contained within a Session Description Protocol (SDP) message body, and an identification of an originator of the structured XML message that added a media component to the collaborative session.

46. The apparatus of claim 41, wherein an owner of the media component is derived by the controller device and the SCC application server based on an outcome of a previous inter-UE inter user equipment transfer operation.

47. The apparatus of claim 41, wherein the computing platform is further for:

communicating the change in the at least one media operation using signaling contained in a Session Initiation Protocol (SIP) header.

48. The apparatus of claim 47, wherein the first UE separately tracks the change using the sequential index.

49. The apparatus of claim 48, wherein the sequential index comprises a generator identifier, a message identifier and a media identifier.

50. The apparatus of claim 41, wherein the synchronizing tracking between the first UE and the SCC application server uses a Session Description Protocol (SDP) offer/answer mechanism.

51. The apparatus of claim 41, wherein the computing platform is further for maintaining the media components information by tracking a media direction attribute.

52. The apparatus of claim 41, wherein the computing platform is further for maintaining the media components information by indicating that a bi-directional media component comprises a plurality of unidirectional media components respectively terminated at a different UE.

* * * * *